(12) United States Patent
Yuen

(10) Patent No.: US 6,215,811 B1
(45) Date of Patent: *Apr. 10, 2001

(54) STORE AND DUMP, SPREAD-SPECTRUM HANDOFF

(75) Inventor: Elmer Yuen, Tsim Sha Tsui (HK)

(73) Assignee: Golden Bridge Technology, Inc., West Long Branch, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/181,724

(22) Filed: Oct. 29, 1998

Related U.S. Application Data

(63) Continuation of application No. 08/638,394, filed on Apr. 29, 1996, now Pat. No. 5,864,578.

(51) Int. Cl.[7] .................................................. H04B 1/707
(52) U.S. Cl. .................. 375/143; 375/142; 375/150; 375/152; 370/412; 455/436
(58) Field of Search ...................... 375/140, 142, 375/143, 150, 152; 370/331, 328, 412; 455/403, 421, 436, 437, 439, 442

(56) References Cited

U.S. PATENT DOCUMENTS

| | | | |
|---|---|---|---|
| 3,819,872 | 6/1974 | Hamrich | 179/41 |
| 4,201,892 | 5/1980 | Schmidt | 370/104 |
| 4,222,115 | 9/1980 | Cooper et al. | 375/1 |
| 4,765,753 | 8/1988 | Schmidt | 379/60 |
| 5,056,109 | 10/1991 | Gilhousen et al. | 375/1 |
| 5,101,501 | 3/1992 | Gilhousen et al. | 455/33 |
| 5,164,198 | 11/1992 | Omura | 375/206 |
| 5,179,571 | 1/1993 | Schilling | 375/1 |
| 5,257,283 | 10/1993 | Gilhousen et al. | 375/1 |
| 5,265,119 | 11/1993 | Gilhousen et al. | 375/1 |
| 5,345,467 | 9/1994 | Lomp et al. | 375/1 |
| 5,864,578 | * 1/1999 | Yuen | 375/143 |

* cited by examiner

Primary Examiner—Young T. Tse
(74) Attorney, Agent, or Firm—David Newman Chartered

(57) ABSTRACT

A system and method for handing off a remote unit from a first base station to a second base station, in a cellular spread-spectrum communications network, without loss of data. The remote unit transmits data to the first base station at a first data rate, and receives a first spread-spectrum signal having a first signal quality from the first base station. The remote unit monitors the first signal quality and compares the first signal quality to a plurality of signal qualities of a respective plurality of received-spread-spectrum signals. The remote unit initiates handoff when any of a number of predetermined criteria are met. Upon initiating handoff to the second base station, the remote unit stores the data that would otherwise have been transmitted. Once handoff is complete, the remote unit transmits the stored data to the second base station at a second data rate, with the second data rate greater than the first data rate. Once the stored data has been transmitted, the remote unit transmits data to the second base station at a data rate and power level comparable to the first data rate and the first power level.

29 Claims, 12 Drawing Sheets

1 BIT = $\frac{1}{8}$ SYMBOL

| 32 | 1 | 1 | 152 | 138 |
|---|---|---|---|---|
| HDR | SIG | APC | DATA | CRC |

FIG. 17

1 BIT = $\frac{1}{8}$ SYMBOL

| 32 | 1 | 1 | 192 | 98 |
|---|---|---|---|---|
| HDR | SIG | APC | DATA | CRC |

FIG. 18

1 BIT = $\frac{1}{16}$ SYMBOL

| 32 | $\frac{1}{2}$ | $\frac{1}{2}$ | 192 | 99 |
|---|---|---|---|---|
| HDR | SIG | APC | DATA | CRC |

FIG. 19

1 BIT = $\frac{1}{32}$ SYMBOL

←———— 324 ————→

| 32 | $\frac{1}{4}$ | $\frac{1}{4}$ | 256 | 35.5 |
|---|---|---|---|---|
| HDR | SIG | APC | DATA | CRC |

STORE AND DUMP, SPREAD-SPECTRUM HANDOFF

This patent stems from a continuation application of U.S. patent application Ser. No. 08/638,394, filed Apr. 29, 1996, entitled MATCHED FILTER-BASE HANDOFF METHOD AND APPARATUS, issued as U.S. Pat. No. 5,864,578 on Jan. 26, 1999. The benefit of the earlier filing date of the parent patent application is claimed for common subject matter pursuant to 35 U.S.C. §120.

BACKGROUND OF THE INVENTION

This invention relates to spread-spectrum communications, and more particularly to a method and apparatus for handing-off a remote unit between two base stations.

DESCRIPTION OF THE RELEVANT ART

A spread-spectrum communications system uses message data. Message data requires transmission without error. When a mobile station moves from a first base station to a second base station, the chip sequence used for the channel containing the digital data has to be handed-off so as to not interrupt communications so as to produce errors.

Multiple coverage areas are employed by mobile communications systems to accommodate communications over a wide geographic region. Each geographic area has several base stations to provide radiotelephones within the base site coverage area with a number of radiotelephone communication channels. Simulcast communication systems and cellular communication systems provide hand-offs between coverage areas. Simulcast communication systems involve linking together the respective coverage areas of several communication sites to form a large geographic area coverage. As a mobile radio moves between coverage areas, a conversation on the mobile radio is maintained through simultaneous reception and broadcasting of the conversation between several sites on the same channel.

In a FDMA cellular communications system, base site equipment periodically measures the signal strength of the radiotelephone during the conversation and, once the signal strength reaches a relatively low threshold, the same base site equipment sends a message to the adjacent base sites to determine which base site's area the radiotelephone is entering. The radiotelephone is then instructed by the base site equipment associated with the coverage area into which the radiotelephone is moving to communicate on a selected channel.

SUMMARY OF THE INVENTION

A general object of the invention is a method and apparatus for handing off a remote unit between two base stations without interrupting communications between the remote unit and the base stations.

The present invention, as embodied and broadly described herein, provides a method and apparatus for handing off a remote unit between two base stations in a spread-spectrum-communications system. The spread-spectrum-communications system has a plurality of base stations and a plurality of remote units within a geographical area. A particular remote unit communicates with a first base station using spread-spectrum modulation. The remote unit has a matched filter for despreading a first received-spread-spectrum signal transmitted from the first base station. The remote unit transmits data to the first base station at a first data rate and a first power level.

The method comprises the steps, at the remote unit, of monitoring at the output of the matched filter of the remote unit, a first signal quality of the first received-spread-spectrum signal transmitted from the first base station. The first signal quality may be probability of error, power level, signal-to-noise ratio, or other signal quality as is well known in the art. The method includes scanning a plurality of received-spread-spectrum signals radiated from the plurality of base stations. A plurality of signal qualities for the plurality of received-spread-spectrum signals, respectively, are stored, and according to the method of the present invention, the remote unit selects from the plurality of received-spread-spectrum signals, using the plurality of signal qualities from the received plurality of received-spread-spectrum signals, a second received-spread-spectrum signal. The second received-spread-spectrum signal has a second signal quality. Typically the second received-spread-spectrum signal is chosen from the plurality of received-spread-spectrum signals because it has a signal quality which is better than the remaining plurality of signal qualities.

The method includes the step of determining when the first signal quality falls below a predetermined threshold and/or below the second signal quality. By falling below the second signal quality is meant, for example, that the second signal quality might have a probability of error which is less than the probability of error of the first signal quality. Upon the occurrence of this event, the remote unit determines it is time to handoff and sends a request to a central control unit for handoff to the second base station.

Upon requesting handoff to the second base station, the remote unit stores data that would normally be transmitted during the period of time during which the handoff occurs. Thus, during the period of time over which handoff occurs, data need not be transmitted from the remote unit to the first base station. Similarly, the first base station may store data during the period of time during which handoff occurs, and thus data need not be transmitted from the first base station to the remote unit.

The steps further include, from the remote unit, initiating handoff to the second base station. Upon handoff, the second received-spread-spectrum signal is synchronized in the remote unit. The remote unit then transmits to the second base station the stored data at a second data rate and at a second power level. Typically the second data rate is greater than the first data rate, and the second power level is greater than the first power level. After the stored data is transmitted to the second base station, the second base station continues to communicate with the remote unit at the first data rate and the first power level. After the stored data is transmitted to the second base station, the second base station and the remote unit may continue to communicate at the second power level and/or second data rate, or at a different power level and data rate, dependent on geographical factors. Thus, the data stored at the remote unit is transferred to the second base station.

Similarly, data stored at the first base station may be transferred to the second base station, and transmitted to the remote unit in a similar fashion, at a higher data rate and a higher power level than is normally used for transmitting to the remote unit.

The method steps may be repeated for any number of handoffs, with the first base station being that base station communicating with the remote unit at a given time, and the second base station being whatever base station of the plurality of base stations is selected as having the best signal quality.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIGS. 12–20 illustrate frequency division duplex examples;

DETAILED DESCRIPTION OF THE PREFERRED EMBODIMENTS

Figure 1:
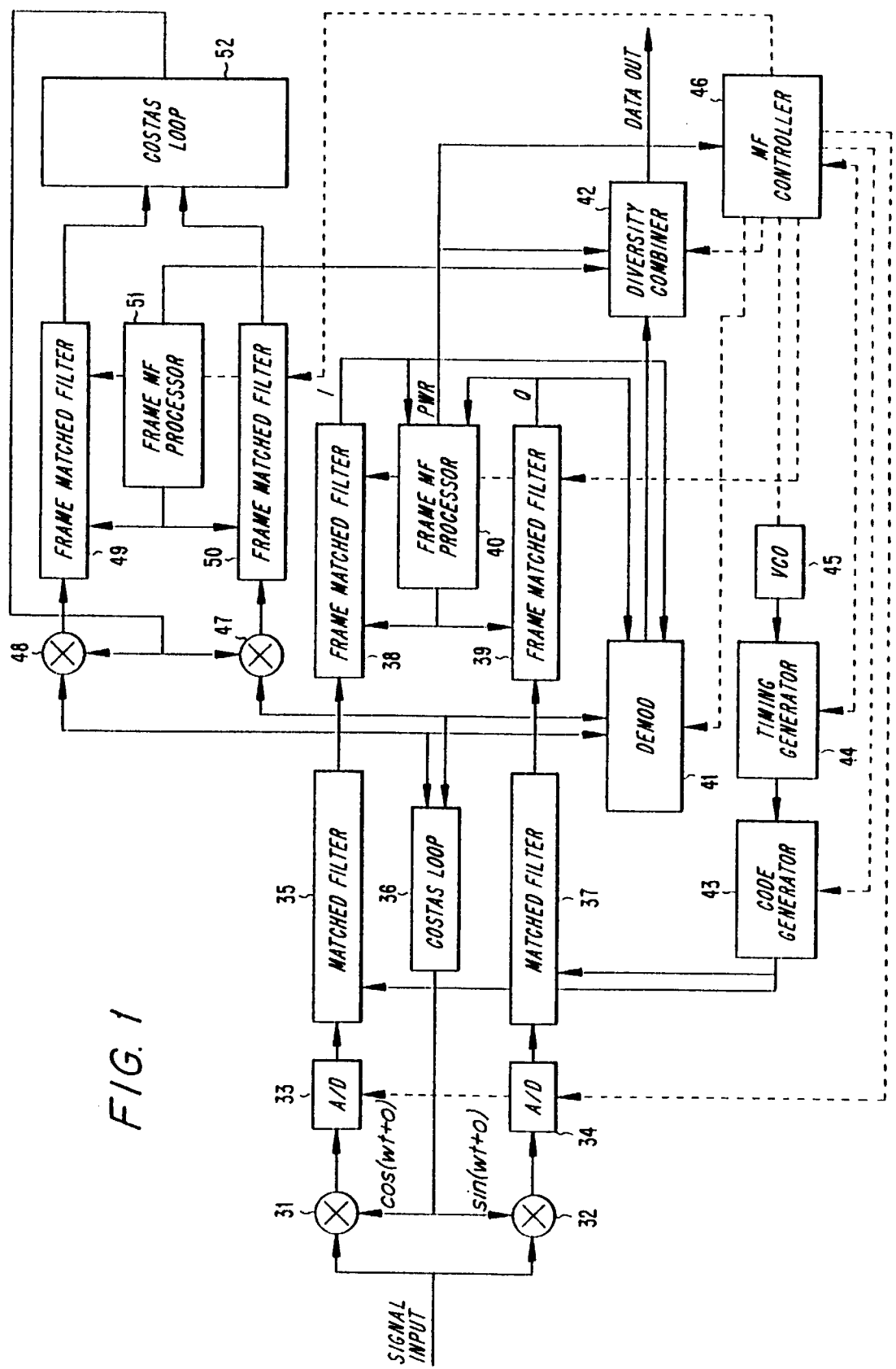
FIG. 1 is a block diagram of a signal-time-sharing, matched-filter-based demodulator.

Reference now is made in detail to the present preferred embodiments of the invention, examples of which are illustrated in the accompanying drawings, wherein like reference numerals indicate like elements throughout the several views.

The present invention provides a new and novel system and method for handing off a remote unit between two base stations. The invention is taught, by way of example, for handing off a remote unit from a first base station transmitting a first received-spread-spectrum signal to the remote unit, to a second base station transmitting a second received-spread-spectrum signal to the remote unit.

A received-spread-spectrum signal may include a plurality of packets. Continuous, non-packeted spread-spectrum signals also may be used with the handoff method and apparatus. In a continuous spread-spectrum signal, a header type of sequence would have to occur periodically in the continuous spread-spectrum signal, from which timing may be triggered. The latter embodiment might be referred to as a data block with a header, and is equivalent to the packet with header as discussed herein. Hereinafter, the discussion refers to the packet and header, with the understanding that other embodiments are equivalent.

Each packet has a header followed in time by data. The header is generated from spread-spectrum processing, by using techniques well known in the art, a header-symbol-sequence signal with a chip-sequence signal. The header-symbol-sequence signal is a predefined sequence of symbols. The header-symbol-sequence signal may be a constant value, i.e., just a series of 1-bits or symbols, or a series of 0-bits or symbols, or alternating 1-bits and 0-bits or alternating symbols, a pseudorandom symbol sequence, or other predefined sequence as desired. The chip-sequence signal is user defined and, in a usual practice, is used with a header-symbol-sequence signal. The header indicates the start of data, aids in acquisition and reacquisition, and helps provide phase reference between multipaths for diversity combining such as in time diversity systems, sometimes referred to as RAKE systems.

The data part of the spread-spectrum packet is generated similarly, from techniques well known in the art as used for the header, by spread-spectrum processing a data-symbol-sequence signal with the chip-sequence signal. The data-symbol-sequence signal may be derived from data, or an analog signal converted to data, signalling information, or other source of data symbols or bits. The chip-sequence signal can be user defined, and preferably is nearly orthogonal to other spread-spectrum channels using the chip-sequence signal, as is well known in the art.

The matched filter embodiment is discussed initially, followed by a discussion on the handoff method and apparatus.

Matched Filter

The spread-spectrum-matched filter apparatus disclosed herein was disclosed in U.S. patent application entitled SYNCHRONIZATION OF DIRECT SEQUENCE CDMA SIGNALS, by Sorin Davidovici and Emmanuel Kanterakis, having Ser. No. 08/564,007 and filing date of Nov. 29, 1995. Broadly, the spread-spectrum-matched-filter apparatus includes code means, symbol-matched means, frame-matched means, control means, and demodulator means. The control means is coupled to the code means and symbol-matched means. The frame-matched means is coupled to the output of the symbol-matched means. The demodulator means is coupled to the output of the symbol-matched means.

The code means generates a replica of the chip-sequence signal. The replica of the chip-sequence signal is the same sequence as used for generating, at a spread-spectrum transmitter, the received-spread-spectrum signal which arrives at the input of the spread-spectrum-matched-filter apparatus. The code means can change, over time, the particular chipping sequence from which the replica of the chip-sequence signal is generated. Accordingly, the spread-spectrum-matched-filter apparatus can be used for a variety of chip-sequence signals as generated by the code means, as might be used in a cellular-spread-spectrum architecture where a receiver might move from one geographical area to another. As the spread-spectrum-matched-filter apparatus moves from one geographical area to another, by way of example, a requirement might be imposed to change the chip-sequence signal in each of the different geographical areas. Similarly, each transmitter within the geographical area of a base station may have a different chip-code sequence.

The symbol-matched means has a symbol-impulse response. The prefix "symbol" is used to denote those means or components which operate to detect or process a data or header symbol from the received-spread-spectrum signal. The symbol-impulse response can be set from the replica of the chip-sequence signal generated by the code means. Thus, the symbol-impulse response may be set for filtering from the received-spread-spectrum signal, the header and the data-symbol-sequence signal. With the symbol-impulse response set to the replica of the chip-sequence signal, and with the header portion of the received-spread-spectrum-signal being present at the receiver, the symbol-matched means outputs a despread-header-symbol-sequence signal. Upon detecting the despread-header-symbol sequence, the frame-matched means outputs a high level signal which may be used as a start-data signal. Other uses may be to synchronize the sequence of transmit, switching and receive cycles or to generate a timing signal for any other event that is related in time to the header.

The symbol-matched means continues to have the symbol-impulse response set from the replica of the chip-sequence signal. When the data portion of the received-spread-spectrum signal is present at the receiver, the symbol-matched means filters the received-spread-spectrum signal. Timing to sample the data portion of the received-spread-spectrum signal is triggered from the start-data signal. Thus, the symbol-matched means outputs the despread-data-symbol-sequence signal. Accordingly, the symbol-matched means can despread the header and the data portion of the received-spread-spectrum signal.

The frame-matched means has a frame-impulse response matched to the header-symbol-sequence signal. Thus, the frame-matched means filters the despread-header-symbol-sequence signal from the symbol-matched means, and generates as a result thereof, a start-data signal when the despread-header-symbol-sequence signal matches the frame-impulse response. The frame-matched means may be programmable, i.e., have a programmable frame-impulse response, which might change between different geographical areas.

The control means controls the setting of the symbol-impulse response of the symbol-matched means. The control means can dynamically set the symbol-matched means, by using the replica of the chip-sequence signal generated by the code means, to match the chip-sequence signal embedded in the received-spread-spectrum signal.

The symbol-matched means may include an in-phase-symbol-matched means and a quadrature-phase-symbol-matched means. The in-phase-symbol-matched means has an in-phase-symbol-impulse response which can be set from the replica of the chip-sequence signal generated by the code means. Depending on which setting the in-phase-symbol-matched means has, the in-phase-symbol-matched means despreads from the received-spread-spectrum signal, an in-phase-component of the header portion of the packet as a despread-in-phase-component of the header-symbol-sequence signal, or an in-phase component of the data portion of the packet as a despread-in-phase component of the data-symbol-sequence signal.

The quadrature-phase-symbol-matched means has a quadrature-impulse response which can be set from the replica of the chip-sequence signal generated by the code means. When the quadrature-phase-symbol-matched means has the quadrature-impulse response matched to the chip-sequence signal, the quadrature-phase-symbol-matched means despreads from the received-spread-spectrum signal a quadrature-phase component of the header portion of the packet as a despread-quadrature-phase component of the header-symbol-sequence signal. Similarly, when the quadrature-phase-symbol-matched means has the quadrature-symbol-impulse response set from the replica of the chip-sequence signal, the quadrature-phase-symbol-matched means despreads the received-spread-spectrum signal as a quadrature-component of the data portion of the packet as a despread-quadrature-phase component of the data-symbol-sequence.

In use, the control means sets the in-phase-symbol-matched means and the quadrature-phase-symbol-matched means matched to detect the chip-sequence signal. The in-phase-symbol-matched means and the quadrature-phase-symbol-matched means are matched simultaneously, and preferably are matched to the same chip-sequence signal.

The frame-matched means may include an in-phase-frame-matched means and a quadrature-phase-frame-matched means. The in-phase-frame-matched means has an in-phase-frame-impulse response matched to an in-phase component of the header-symbol-sequence signal. When the in-phase component of the despread-header-symbol-sequence signal from the in-phase-symbol-matched means matches the in-phase-frame-impulse response, then an in-phase-start-data signal is generated.

The quadrature-phase-frame-matched means has a quadrature-phase-frame-impulse response matched to a quadrature-phase component of the header-symbol-sequence signal. When the quadrature-phase component of the despread-header-symbol-sequence signal matches the quadrature-phase-frame-impulse response of the quadrature-phase-frame-matched means, then a quadrature-phase-start-data signal is generated. In practice, the in-phase-start-data signal and the quadrature-phase-start-data signal are generated simultaneously, buy they may also occur at different times.

The in-phase-start-data signal and the quadrature-phase-start data signal are combined as the start-data signal. Timing for sampling the output of the in-phase-symbol-matched means and the quadrature-phase-symbol-matched means for detecting the data-symbol-sequence signal is triggered, at a time delay, from the start-data signal. The time delay may be zero.

In the exemplary arrangement shown in FIG. 1, the code means is embodied as a code generator 43, the symbol-matched means is embodied as an in-phase-symbol-matched filter 35 and a quadrature-phase symbol-matched filter 37, the frame-matched means is embodied as an in-phase-frame-matched filter 38 and a quadrature-phase-frame-matched filter 39, the control means is embodied as a controller 46, and the demodulator means is embodied as a demodulator 41. The in-phase-symbol-matched filter 35 and the quadrature-phase-symbol-matched filter 37 may be constructed as digital-matched filters, surface-acoustic-wave devices, or as software embedded in a processor or as an application specific integrated circuit (ASIC). Also shown is a voltage-controlled oscillator 45, timing generator 44, diversity combiner 42, frame processor 40, Costas loop 36 or other generic tracking loop, in-phase analog-to-digital converter 33, quadrature-phase analog-to-digital converter 34, in-phase mixer 31, and quadrature-phase mixer 32.

The in-phase analog-to-digital converter 33 is coupled between in-phase mixer 31 and in-phase-symbol-matched filter 35. The quadrature-phase analog-to-digital converter 34 is coupled between the quadrature-phase mixer 32 and the quadrature-phase-symbol-matched filter 37. The Costas loop 36 is coupled to the output of the in-phase-symbol-matched filter 35, to the output of the quadrature-phasesymbol-matched filter 37, and to the in-phase mixer 31 and the quadrature-phase mixer 32. The in-phase-frame-matched filter 38 is coupled between the in-phase-symbol-matched filter 35 and the frame processor 40 and the demodulator 41. The quadrature-phase-frame-matched filter 39 is coupled between the quadrature-phase-symbol-matched filter 37 and the processor 40 and the demodulator 41. The code generator 43 is coupled between the timing generator 44 and the in-phase-symbol-matched filter 35 and the quadrature-phase-frame-matched filter 37. The timing control circuit controls the sampling instant of the analog-to-digital converter timing generator 44 to the in-phase-symbol-matched filter 35 and the quadrature-phase-symbol-matched filter 37. The voltage-controlled oscillator 45 is coupled to the timing generator 44 and to the matched-filter controller 46. The diversity combiner 42 is coupled to the frame processor 40 and the demodulator 41. The controller 46 is coupled to the frame processor 40. The prefixes "in-phase" and "quadrature-phase" denote that component, i.e., in-phase or quadrature-phase, of the received-spread-spectrum signal, with which the element operates.

The in-phase analog-to-digital converter 33 and the quadrature-phase analog-to-digital converter 34 may be embodied as a hard limiter which performs one-bit analog-to-digital conversion, or as an N-bit analog-to-digital converter. Analog-to-digital converters are well known in the art.

For control, indicated by broken lines, the controller 46 is coupled to the diversity combiner 42, the frame-matched filter 38, the frame-matched filter 39, the demodulator 41, the timing generator 44, the code generator 43, the in-phase-analog-to-digital converter 33, and the quadrature-phase-analog-to-digital converter 34. The diversity combiner 42 may only process one signal.

For RAKE applications, additional sections of frame-matched filters would be required. Thus, an additional in-phase mixer 48 and quadrature-phase mixer 47, and in-phase-frame-matched filter 49 and quadrature-phase-frame-matched filter 50 would be used with a second frame-matched-filter processor 51 and Costas loop 52. The application RAKE is well known in the art, and thus the addition of the additional frame-matched filter section would be easily recognizable to those skilled in the art.

Referring to FIG. 1, a received-spread-spectrum signal at the signal input is translated to an intermediate frequency or baseband frequency by in-phase mixer 31 and quadrature-phase mixer 32. For discussion purposes, the received-spread-spectrum signal is assumed to be translated to a baseband frequency. The portion of the spread-spectrum receiver which includes low noise amplifiers, automatic-gain-control (AGC) circuits, filters, etc., is well known in the art, and therefore, is not shown. The baseband received-spread-spectrum signal is converted to a digital signal by in-phase analog-to-digital converter 33 and quadrature-phase analog-to-digital converter 34. Thus, a baseband version of the received-spread-spectrum signal is at the input of the in-phase-symbol-matched filter 35 and the quadrature-phase-symbol-matched filter 37.

The in-phase-symbol-matched filter 35 has an in-phase-symbol-impulse response which is set by the replica of the chip-sequence signal from code generator 43. Depending on the setting, the in-phase-symbol-matched filter 35 can despread the received-spread-spectrum signal as a despread-in-phase component of the header-symbol-sequence signal or as a despread-in-phase component of the spread-spectrum-processed data-symbol-sequence signal. Accordingly, the in-phase-symbol-matched filter 35 outputs either a despread-in-phase component of the header-symbol-sequence signal, or a despread-in-phase component of the spread-spectrum-processed data-symbol-sequence signal as a despread-in-phase-data-symbol-sequence signal.

Similarly, the quadrature-phase-symbol-matched filter 37 has a symbol-impulse response which can be set by the replica of the chip-sequence signal generated by the code generator 43. Depending on the setting, the quadrature-phase-symbol-matched filter 37 despreads the received-spread-spectrum signal as a quadrature-phase component of the header-symbol-sequence signal or as a quadrature-phase component of the spread-spectrum-processed data-symbol-sequence signal. Accordingly, the output of the quadrature-phase-symbol-matched filter 37 is either a despread-quadrature-phase component of the header-symbol-sequence signal or a despread-quadrature-phase component of the spread-spectrum-processed data-symbol-sequence signal as a despread-quadrature-phase-data-symbol-sequence signal.

The in-phase-symbol-matched filter 35 and the quadrature-phase-symbol-matched filter 37 are ultimately controlled by the controller 46. The controller 46 controls timing and determines at desired timings when the code generator 43 sets the symbol-impulse responses of the in-phase-symbol-matched filter 35 and the quadrature-phase-symbol-matched filter 37 to the respective chip-sequence signal being used in a particular geographic area.

Figure 2:
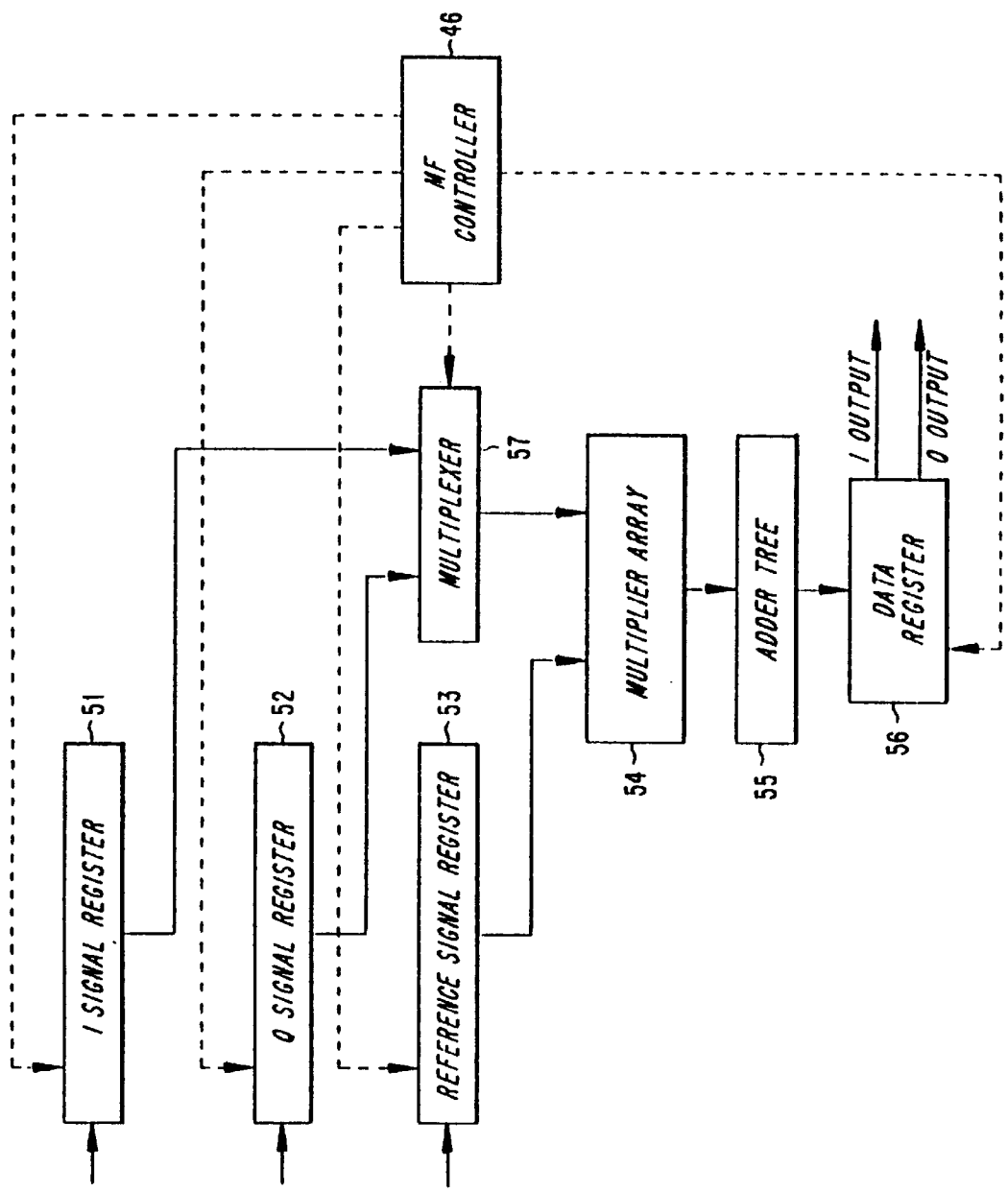
FIG. 2 illustrates a matched filter using time sharing of multiplier array and adder tree.

As shown in FIG. 2, the controller 46 controls the in-phase signal register 51 and the quadrature-phase signal register 52, which correspond to the in-phase-symbol-matched filter 35 and the quadrature-phase-symbol-matched filter 37, respectively.

In FIG. 1, the Costas loop 36 uses the output from the in-phase-symbol-matched filter 35 and the output from the quadrature-phase-symbol-matched filter 37 to generate the cosine signal and sine signal for in-phase mixer 31 and quadrature-phase mixer 32, respectively.

The spread-spectrum receiver receives packets of header and data, which may arrive as a stream of uninterrupted packets in a frequency division duplex (FDD) application, or as separate packets in a time division duplex (TDD) application. The despread and detected header provides timing and synchronization for data within a respective packet.

Figure 3:
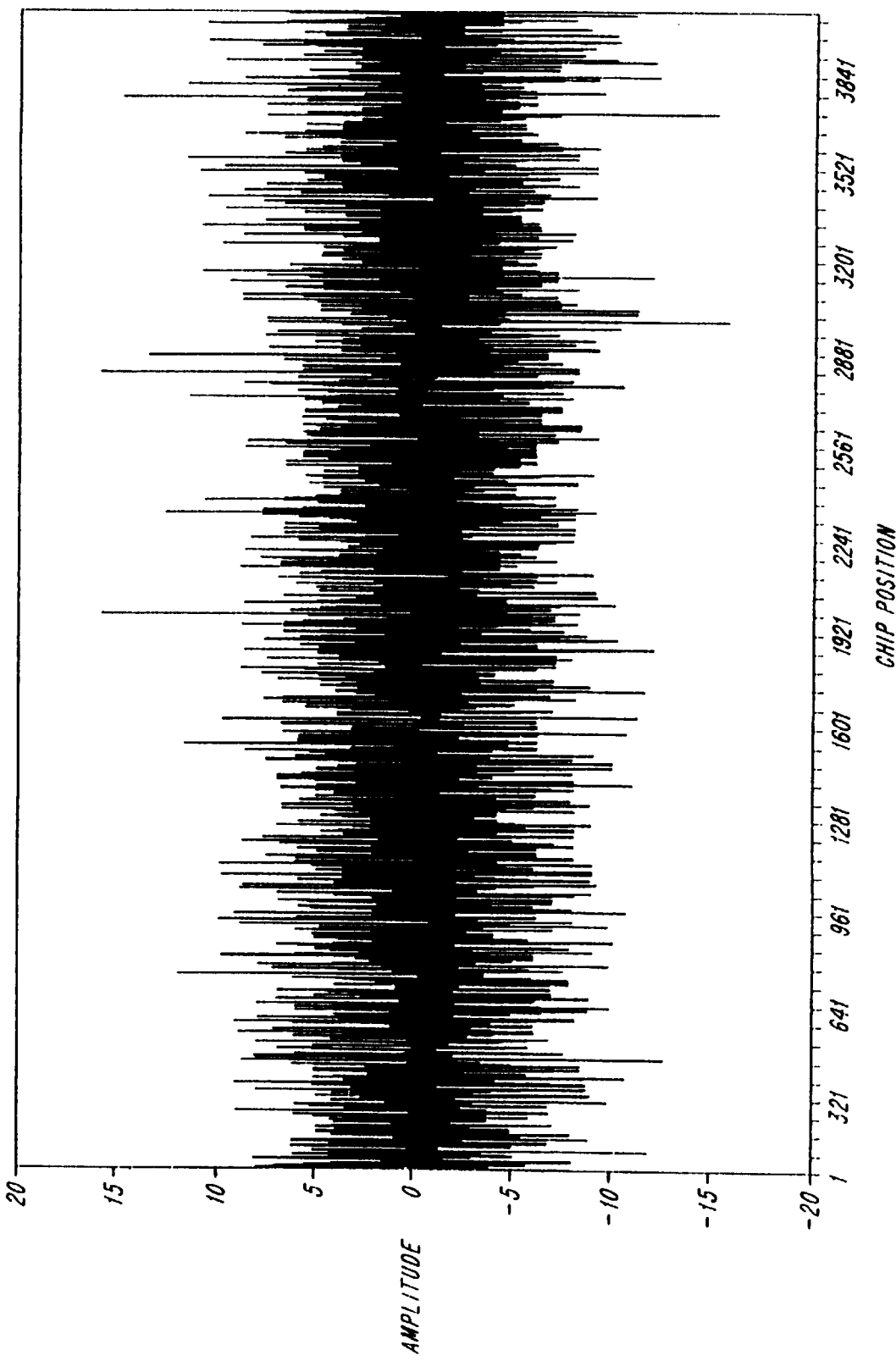
FIG. 3 is an example of an output signal from the symbol-matched filter.
Figure 4:
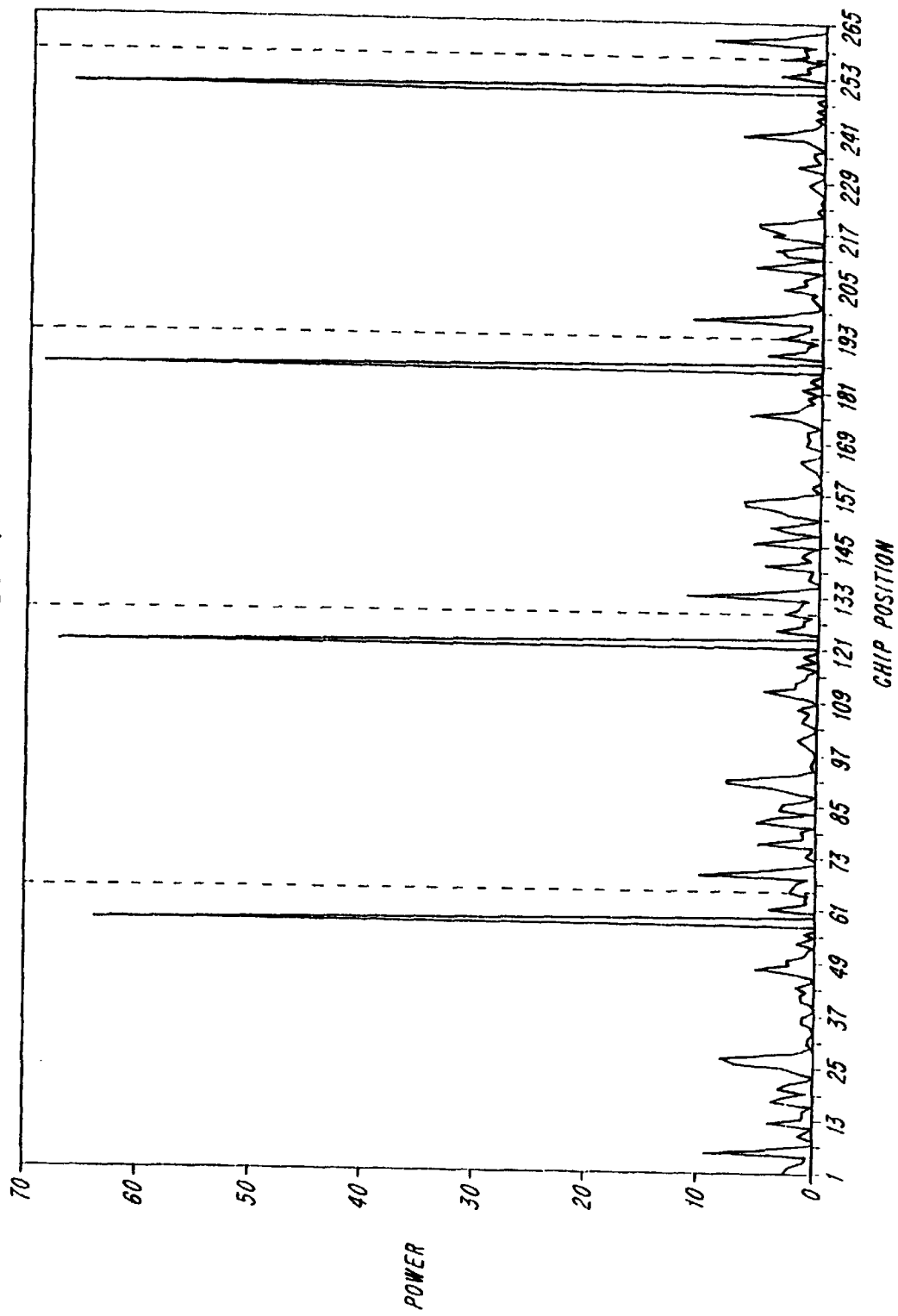
FIG. 4 is an example of an output signal from the frame-matched filter.

When the in-phase-symbol-matched filter 35 and quadrature-phase-symbol-matched filter 37 have their respective symbol-impulse responses matched to the chip-sequence signal, and the header portion of the packet of the received-spread-spectrum signal is present at the receiver input, then the output is a despread-header-symbol-sequence signal. An example of a signal outputted as a despread-header-symbol-sequence signal is illustrated in FIG. 3. The despread-header-symbol-sequence signal is passed through in-phase-frame-matched filter 38 and quadrature-phase-frame-matched filter 39. The in-phase-frame-matched filter 38 has an in-phase-frame-impulse response matched to the in-phase component of the header-symbol-sequence signal, and accordingly, generates an in-phase-start-data signal when the in-phase component of the despread-header-symbol-sequence signal matches the in-phase-frame-impulse response. Similarly, the quadrature-phase-frame-matched filter 39 has a quadrature-phase-frame-impulse response matched to a quadrature-phase component of the header-symbol-sequence signal. When the despread-header-symbol-sequence signal from the quadrature-phase-symbol-matched filter 37 matches the quadrature-phase-frameimpulse response of the quadrature-phase-matched filter 37, then the quadrature-phase-frame-matched filter outputs a quadrature-phase-start-data signal. An example of a signal outputted from the frame-matched filter is illustrated in FIG. 4. The large spike's, i.e., large signal levels, are the start-data signal referred to herein. These spikes or start-data signals serve as timing references to synchronize timing, as disclosed herein. The in-phase-start-data signal and the quadrature-phase-start-data signal are demodulated by demodulator 41, and can be used as an initial timing signal for controlling when the diversity combiner 42 combines the output from the demodulator 41 for the respective signals from in-phase-symbol-matched filter 35 and the quadrature-phase-symbol-matched filter 37.

Additionally, the in-phase-start-data signal and the quadrature-phase-start-data signal can be processed by frame processor 40 to trigger a timing signal, i.e., the start-data signal, to the controller 46 which actuates the timing for when to sample the outputs of the in-phase-symbol-matched filter 35 and the quadrature-phase-symbol-matched filter 37, for detecting the data-symbol-sequence signal.

In a particular implementation of the present invention, the in-phase-symbol-matched filter 35 and the quadrature-phase-symbol-matched filter 37 have their respective in-phase-symbol-impulse response and quadrature-phase-symbol-impulse response determined, under the control of the controller 46, such that they are matched to the chip-sequence signal within 6.4 microseconds (64 chips at 10 Mchips/sec). Typically, current designs have these respective symbol-matched filters loaded within 12.8 microseconds, for a system operating at 100 MHz, with each of the in-phase-symbol-matched filter 35 and the quadrature-phase-symbol-matched filter 37 having a 256 stage shift register (256 chips at 20 Mchips/sec).

The demodulator 41 can be implemented using coherent demodulation, or alternatively using noncoherent demodulation.

The diversity combiner 42 combines in a variety of ways, such as maximum likelihood, straight combining, addition, or the demodulated outputs from the in-phase-symbol-matched filter 35 and the quadrature-phase-symbol-matched filter 37 as demodulated through demodulator 41.

FIG. 2 illustrates the matched filter using the time sharing of the multiplier array and adder tree. Shown in FIG. 2 are in-phase-signal register 51, quadrature-phase-signal register 52, reference-signal register 53, multiplier array 54, adder tree 55, data register 56, and controller 46. As shown, the dotted lines indicate that the controller 46 provides the necessary controlling of the in-phase-signal register 51, the quadrature-phase-signal register 52, the reference-signal reference 53 and the data register 56. The solid lines indicate the signal flow from the in-phase-signal register 51, the quadrature-phase-signal register 52, the reference-signal register 53 through the multiplexer 57. The in-phase-signal register 51 and the quadrature-phase-signal register 52 are coupled through multiplexer 57 to multiplier array 54 to adder tree 55 to data register 56. The data register 56 has an in-phase output and quadrature-phase output.

The present invention also includes a method which uses a symbol-matched filter and a frame-matched filter with a spread-spectrum receiver on a received-spread-spectrum signal. As with the apparatus previously disclosed, the received-spread-spectrum signal is assumed to have a plurality of packets, with each packet including a header and data portion. The header is generated from spread-spectrum processing a header-symbol-sequence signal with a chip-sequence signal. The data portion of the packet is generated from spread-spectrum processing a data-symbol-sequence signal with the chip-sequence signal.

The method comprises the steps of generating a replica of the chip-sequence signal. The method programs the symbol-matched filter with the replica of the chip-sequence signal to set the symbol-matched filter to have a symbol-impulse response matched to the chip-sequence signal. With the symbol-matched filter matched to the chip-sequence signal, the method despreads the header portion of the packet from the received-spread-spectrum signal as a despread header-symbol-sequence signal.

The frame-matched filter has a frame-impulse response matched to the header-symbol-sequence signal. The method therefore uses the frame-matched filter to filter the despread header-symbol-sequence signal. The method thereafter generates from the filtered despread-header-symbol-sequence signal, the data-start signal in response to the despread-header-symbol-sequence signal matching the frame-impulse response of the frame-matched filter.

The method also generates at a time delay from the data-start signal, a data-control signal. The time delay may be zero. In response to the data-control signal, the method programs the frame-matched filter with the replica of the data-chip-sequence signal so that the frame-matched filter has the frame-impulse response matched to the data-symbol-sequence signal. The method thereby despreads, while the frame-matched filter is matched to the data-symbol-sequence signal, the data-spread-spectrum channel from the received-spread-spectrum signal as a despread-data-symbol-sequence signal.

The method as described herein may be extended to in-phase and quadrature-phase components of a received-spread-spectrum signal. As such, the method would have the step of despreading the header portion of the packet from the received-spread-spectrum signal including the steps of despreading, from the received-spread-spectrum signal, the in-phase component of the header as a despread in-phase component of the header-symbol-sequence signal, and despreading, from the received-spread-spectrum signal, the quadrature-phase component of the header as a despread-quadrature-phase component of the header-symbol-sequence signal.

Similarly, the in-phase component and the quadrature-phase component of the received-spread-spectrum signal can be despread as in-phase components and quadrature-phase components of the data-symbol-sequence signal. Accordingly, the method would include despreading, from the received-spread-spectrum signal, an in-phase component of the data portion of the packet as a despread-in-phase component of the data-symbol-sequence signal. The method would also include despreading a quadrature-phase component of the data portion of the packet as a despread-quadrature-phase component of the data-symbol-sequence signal.

When filtering the despread header-symbol-sequence signal into in-phase components and quadrature-phase components, the method can also include generating an in-phase-start-data signal and a quadrature-phase-start-data signal, in response to the in-phase component and the quadrature-phase component of the despread header-symbol-sequence signal matching the in-phase-frame-impulse response and the quadrature-phase-frame-impulse response, respectively.

In operation, the in-phase-symbol-matched filter 35 and the quadrature-phase-symbol-matched filter 37 are loaded with M local sequence symbols, i.e., the replica of the chip-sequence signal. The incoming received-spread-spectrum-signal samples generated by in-phase-analog-to-digital converter 33 and quadrature-phase-analog-to-digital converter 34, respectively, slide by, i.e. are correlated against, the local replicas until they line up, at which time a large information-bearing output is produced. The generation of this large output does not require that a synchronization process be successfully completed a priori or that additional circuits dedicated to the acquisition process be employed and it achieves code synchronization in the shortest possible time to acquire the incoming spreading chip-sequence signal. This has the advantage of lower implementation cost, lower physical volume, reduced power consumption, more rapid implementation and much better performance as measured by the time required to achieve code synchronization.

The presence of a strong signal level output indicates that at that specific moment in time M incoming signal symbols and the M symbols of the local spreading code, i.e., chip-sequence signal, loaded in the in-phase-symbol-matched filter 35 and the quadrature-phase-symbol-matched filter 37 are in alignment. The requirement exists that the in-phase-symbol-matched filter 35 and the quadrature-phase-symbol-matched filter 37 be fully loaded with the next M symbols of the local spreading code, i.e., the chip-sequence signal, at any time prior to the arrival of the next M incoming signal symbols at the in-phase-symbol-matched filter 35 and the quadrature-phase-symbol-matched filter 37. The value of the number M, which denotes the size of the respective symbol-matched filter as measured in the number of signal samples, is much larger than any value on the order of one; in an example embodiment, M is on the order of 250. Because M is much larger than one of the circuits required to implement the code, phase synchronization functions are much easier to design and implement. This has the advantage of lower implementation cost, lower physical volume, reduced power consumption, more rapid implementation and inherently better performance.

The in-phase-symbol-matched filter 35 and the quadrature-phase-symbol-matched filter 37 identify, characterize and extract the information which arrives through all available channels, or paths, intrinsically, without any additional and parallel signal processing paths. The spreading code loaded as a local reference in the in-phase-symbol-matched filter 35 and the quadrature-phase-symbol-matched filter 37 remain in place until all propagation channels have the opportunity to deliver the information signal at the in-phase-symbol-matched filter 35 and the quadrature-phase-symbol-matched filter 37; the matched filter can then easily recover all $L=T_M(W+1)$ signals it is capable of receiving. As the input signals are offset in time due to differences in length of the propagation path, and since the in-phase-symbol-matched filter 35 and the quadrature-phase-symbol-matched filter 37 are linear devices, the outputs due to the signals' propagation through different channels are output by the in-phase-symbol-matched filter 35 and the quadrature-phase-symbol-matched filter 37 offset in time. Thus the reception and separation of the signals propagating through different channels does not require any additional circuits and the individual signals, which are now separate in time, can be easily individually manipulated and combined in optimum ways such that the matched filter receiver attains the performance of an L-diversity system.

A receiver capable of identifying, separating and combining large numbers (L) of signal replicas propagating through different channels is a time diversity receiver and is commonly called a RAKE receiver. The RAKE receiver structure can be implemented using the matched filter without the excessive complexity incurred by alternative system implementations. The in-phase-symbol-matched filter 35 and the quadrature-phase-symbol-matched filter 37 implementation at the heart of the diversity processing system has the advantage of lower implementation cost, lower physical volume, reduced power consumption, more rapid implementation, less complex control and better performance.

In contrast, the symbol-matched-filter-based demodulator as described herein utilizes only one such set of circuits and, using information which is intrinsically generated, can then coherently demodulate any number of signal replicas that arrive via separate propagation paths. The mechanism by which this is accomplished is to employ one conventional phase tracking circuit, e.g., phase-locked loop (PLLs), Costas loop, or $n^{th}$ power loop, in order to establish a temporarily stable phase reference and to then extract the phase offset of each individual signal with respect to that phase reference. The incoming signal is first downconverted non-coherently to some frequency, including the 0 Hz frequency (DC). Then the in-phase and quadrature-phase channel outputs are read from the in-phase-symbol-matched filter 35 and the quadrature-phase-symbol-matched filter 37, respectively. The phase offset of the carrier signal is contained in the relative amplitudes of the in-phase and quadrature-phase outputs which are then used directly to demodulate the received data signal. Alternatively the phase estimate on the individual propagation paths can be improved by further matched filtering to demodulate the signal with performance equal to or better than that obtained using conventional coherent demodulators but without the added complexity introduced by conventional coherent demodulators. Therefore the symbol-matched filter-based implementation has the advantage of much lower complexity, lower implementation cost, lower physical volume, reduced power consumption, more rapid implementation and better performance.

A set of multipliers and the associated adder tree may be eliminated. By inputting the signals at the input of the remaining set of multipliers and the associated adder tree from two multiplexers, each multiplexer may serve to connect to the multiplier/adder tree structure either the in-phase or quadrature-phase signal registers. This implementation adds the complexity of two multiplexers and reduces the complexity associated with a set of multipliers and an adder tree for a significant net reduction in complexity.

The symbol-matched filter is a digital signal processor, the output of which is of interest only at that instant in time when the portion of interest of the incoming signal is fully loaded and is of no interest at any other time. In the present implementation the size of the symbol-matched filters is approximately 64 or 256 stages, requiring 64 or 256 clock cycles, respectively, to load the input samples of the received-spread-spectrum signal. The output of the symbol-matched filter is of interest only for one or two clock cycles and is of no interest for the rest of the approximately 248 clock cycles. Thus the circuit can be reused during these 248 clock cycles. Two or more signals, say N signals, can utilize the same matched filter provided that the signals are not lined up in phase and the outputs are thus staggered in time. If N=5 signals shared the same matched filter, the signals could then be staggered by approximately 45 clock cycles and the matched filter could be operated in a number of ways, including the following manner:

1. Starting at clock cycle 5, the symbol-matched filters are loaded with the reference corresponding to the first signal. The output due to the first signal occur during the 50$^{th}$ and 51$^{st}$ clock cycle.

2. Starting at clock cycle 55, the symbol-matched filters are loaded with the reference corresponding to the second signal. The output due to the second signal will occur during the 100$^{th}$ and 101$^{st}$ clock cycle.

3. Starting at clock cycle 105, the symbol-matched filters are loaded with the reference corresponding to the third. signal. The output to the third signal will occur during the 150$^{th}$ and 151$^{st}$ clock cycle.

4. Starting at clock cycle 155, the symbol-matched filters are loaded with the reference corresponding to the fourth signal. The output due to the fourth signal will occur during the 200$^{th}$ and 201$^{st}$ clock cycle.

5. Starting at clock cycle 205, the symbol-matched filters are loaded with the reference corresponding to the fifth signal. The output due to the fifth signal will occur during the 250$^{th}$ and 251$^{st}$ clock cycle.

The cycle then repeats itself for the next output due to the first, second, third, fourth and fifth signals using only one matched filter. The complexity and size of implementation is reduced by 80% while the signal processing benefits remain constant.

Matched Filter Performance

The matched filter is preferred since it can provide significantly faster acquisition than the standard serial-search technique. For example, if the chip rate were $f_c$ and the number of chips that must be searched before accepting or discarding a hypothesis is N and the code length is L, then the "worst-case" acquisition time for serial search is $LN/f_c$ while the equivalent matched-filter acquisition time is $L/f_c$. Typically, N is between 1000 and 10,000, so that for a matched filter of length N, a significant savings can accrue by using a matched filter.

Until now, matched filters have been restricted to small values of N as a result of the large number of gates needed for matched filter implementation. One aspect of this invention is a novel procedure to implement the matched filter.

One procedure for coherent detection used since the 1940's is to transmit a reference signal in addition to the data bearing signal. In a spread-spectrum system the reference signal, such as a pilot channel, and data signal are both spread. However the use of the transmitted reference signal is inefficient since the power transmitted in the reference signal means less power is transmitted in the data bearing signal. This reduces capacity or, for the same capacity, increases data error rate.

Another aspect of this invention is to not employ a transmitted reference but to achieve "coherent" detection by employing frequency locked and phase locked circuits which do not require a large number of gates.

Matched Filter Examples

The matched filter of the present invention, illustrated in FIGS. 1 and 2, is divided into two or more matched filter sections. The present invention employs two sections. For the CP ASIC, by way of example, the symbol-matched filter is $N_s$=64 chips long and the frame-matched filter is $N_f$=15 chips long. For the WLL and PCS ASIC, by way of example, the symbol-matched filter is 256 chips long and the frame-matched filter is 32 chips long. The size of the symbol-matched filter determines the number of simultaneous users. It has been found experimentally that the number of simultaneous signals in the DS-CDMA. system is approximately $N_s/2$, when using the cascaded matched filter approach diagrammed in FIGS. 1 and 2.

The symbol-matched filter output is noisy and a casual observation does not indicate the instant at which a match occurs when there are many signals present simultaneously. This is illustrated in FIG. 3.

There are 256 possible instants in a 256-stage matched filter, of which only one is correct. To find the correct time and to verify it using the frame-matched filter one can use a "brute force" approach. Assume instant one is correct. Let the output of the symbol-matched filter input the frame-matched filter every 256 chips at times 1, 257, 513, etc. Repeat this procedure for instants 2, 3, 4, . . . , 256. The averaging by the frame-matched filter matches the number of signals present, and the "noise" appears to be reduced by the size of the frame-matched filter. Thus, in the case of the 256×32 matched filter, the use of 128 signals appears, at the frame-matched filter input, to be the same as only four signals, at the symbol-matched filter output. The acquisition time is then $T_{acq}$=256×256×32/$f_c$=2$^{21}$/$f_c$ which approximately equals 2×10$^6$/$f_c$. If $f_c$=20 MHz then the acquisition time would be approximately 0.1 second.

Figure 5:
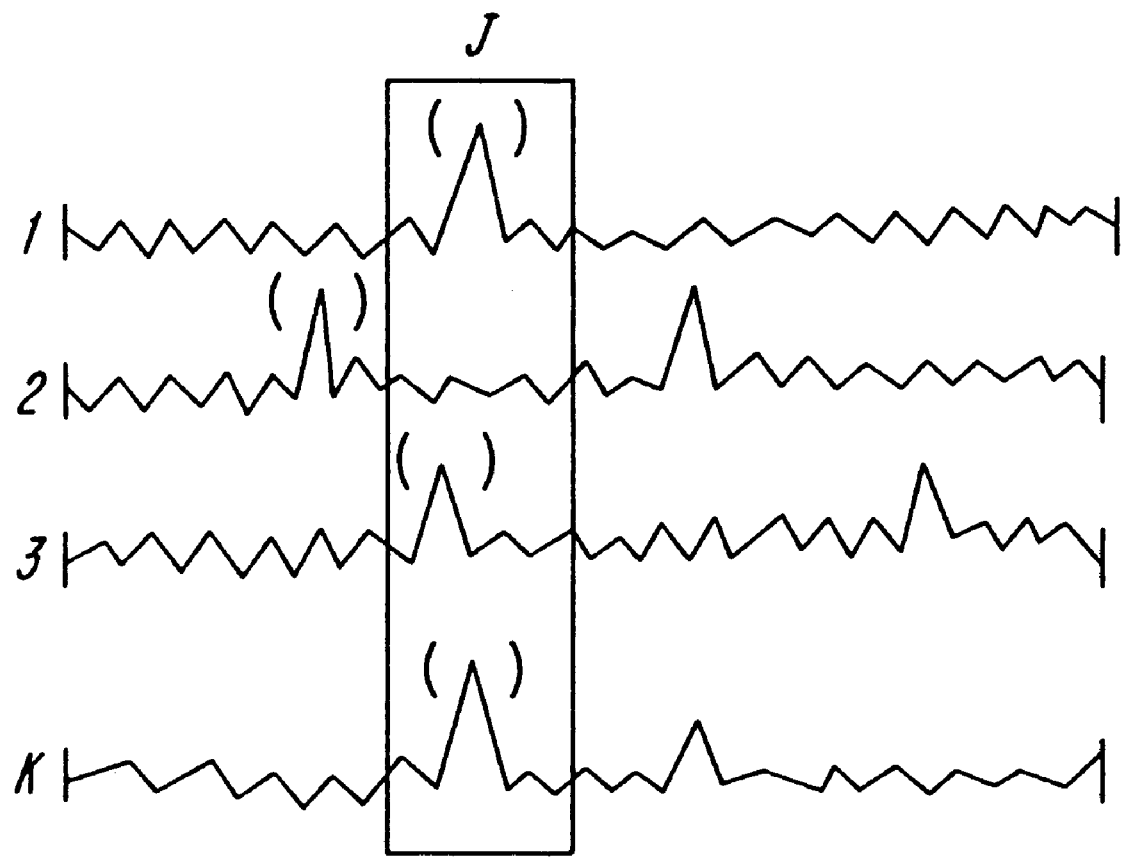
FIG. 5 illustrates an approach to finding a correct time instant at which to measure an output of a simple-matched filter.

The preferred approach to finding the correct time instant is to measure all 256 symbol-matched filter outputs and record the largest. This procedure is then repeated until a given K number of measurements indicate the same instant, as illustrated in FIG. 5.

In one preferred system, the search is terminated when there are five coincidences. Clearly, as one looks for more coincidences the confidence level increases. However, as K increases the acquisition time increases. If K becomes too long, say K=15, then the sampling is assumed to be at the wrong time and the sampling time is adjusted.

After time slot J is selected, the choice is verified using the frame-matched filter. Typically K approximately equals 8, so that the typical acquisition time $T_{acq}$ is 8×256×32/$f_c$=2$^{16}$/$f_c$ which approximately equals 64×10$^3$/$f_c$. If $f_c$=20 MHz, $T_{acq}$=3 ms, far less than the 100 ms required using the "brute force" approach.

Figure 6:
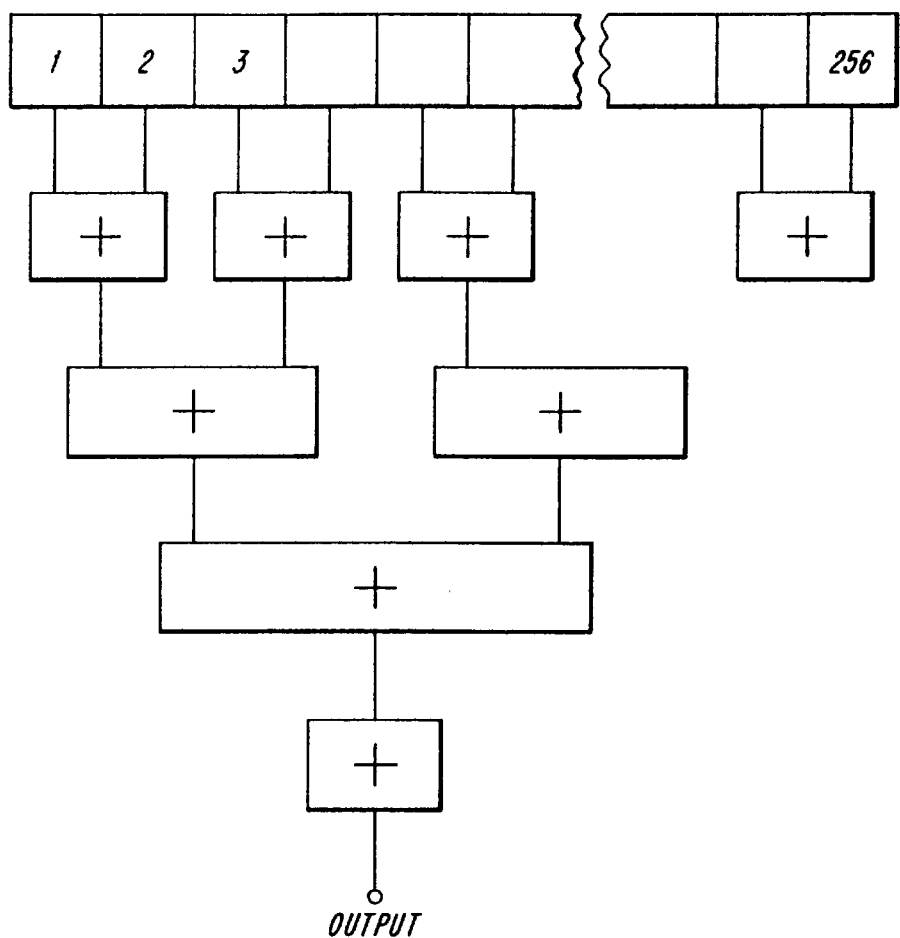
FIG. 6 illustrates a matched filter having register and adder.

The matched filter has a register and adders, as shown in FIG. 6. For the example of 256 registers, row 1 has 128 adders; row 2 has 64; row 3 has 32; etc. Thus a 256-chip matched filter uses 128+64+32+16+8+4+2+1=255 adders. The matched filter uses a symbol-matched filter plus a frame-matched filter, which is equivalent to a 256×32=8192 stage matched filter which would have 8191 adders. This requirement of 8191 adders is why large matched filters were not built in the prior art. Using the present configuration there are 255+31=286 adders. This is a reduction of almost 30 times.

Sampling

Usually, one samples a signal at the Nyquist rate. Thus, if the chip rate were $f_c$ then one would ordinarily sample each chip twice or at the rate 2$f_c$. Hence, if there were 256 chips in a symbol-matched filter, then one would need either a pair of 256 symbol-matched filters, a 512 symbol-matched filter, or one would have to reduce the number of symbols to 128 so that the symbol-matched filter equals 256.

Figure 7:
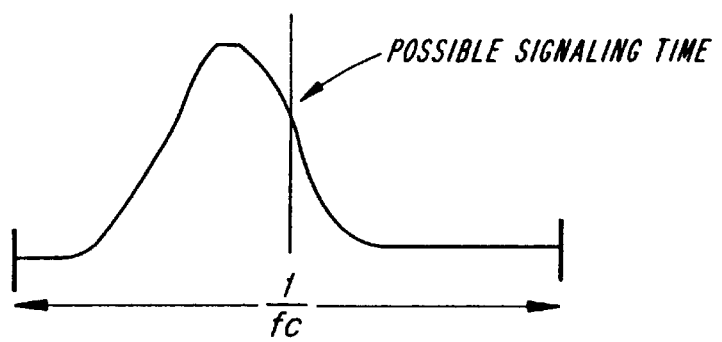
FIG. 7 illustrates a frequency response curve demonstrating that sampling may not occur at a chip peak.

A preferred approach is to sample once per chip. Thus, the sampling rate is $f_c$. The problem with this approach is that the sampling may not occur at the peak of a chip, as illustrated in FIG. 7. This problem is compounded by the fact that the local receiving chip-clock crystal might differ slightly from the chip-clock crystal in the transmitter. As a result of clock mismatch, the sampling instant slides across the chip.

Figure 8:
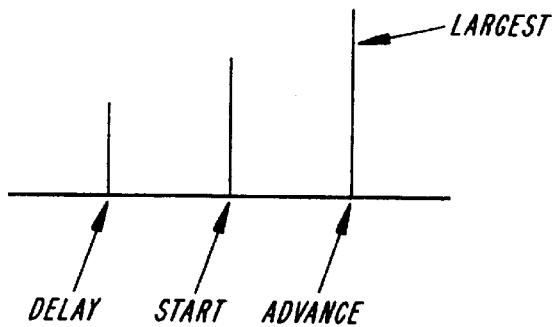
FIGS. 8 and 9 illustrate selection of the correct time to yield the largest output.
Figure 9:
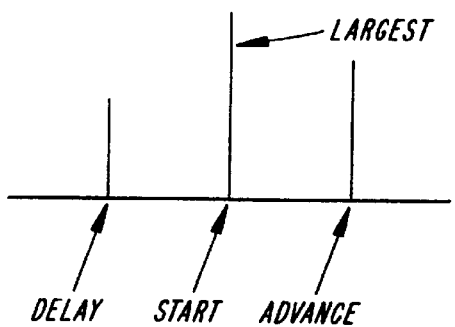

Thus, one aspect of this invention is to ensure that the sampling clock continually samples at or near the peak of each chip. First, if K became too long then the clock phase is shifted by ½ chip. Second the present invention averages the outputs of the symbol-matched filter $N_F$ times, delays the chip clock by a fraction of a chip, preferably ⅛ chip, and averages the output of the symbol-matched filter, $N_F$ times. Then the chip clock is advanced by ⅛ chip and again the symbol-matched filter output is averaged $N_F$ times. The timing selected is that which yields the largest output. This process is continually repeated, as illustrated in FIG. 8 and 9.

Thus, for $N_F$=32 a trial takes $3 \times 256 \times 32/f_c$ which approximately equals $25,000/f_c$. If $f_c$=20 MHz, a trial takes 1 ms.

Frequency and Phase Locking

The transmitter and receiver RF crystal frequencies usually differ. Differences of 20 kHz are possible. In addition, the incoming signal undergoes a Doppler shift due to the fact that the transmitter and/or receiver may be in motion. The Doppler shift usually is not larger than 300 Hz at a center frequency of 2 GHz.

In order to use coherent detection without a pilot transmitted reference, the phase as well as the frequency of the transmit and receiver oscillators must be locked. The frequency locked loop/phase locked loop are in general well known concepts. Our implementation is discussed in a separate patent application.

Packet Structure

Figure 10:
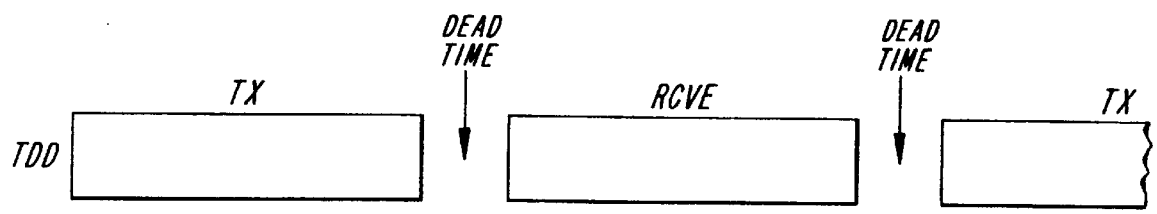
FIG. 10 illustrates an example of packets for time division duplex.

There are two possible modes of operation: time-division duplex (TDD) and frequency-division duplex (FDD). The time-division duplex can be used for the CP ASIC. The frequency-division duplex can be used for the WLL and PCS ASIC since higher data rates are needed for WLL and PCS applications. Using time-division duplex effectively doubles the data rate. FIG. 10 illustrates an example of packets for time division duplex.

Figure 11:
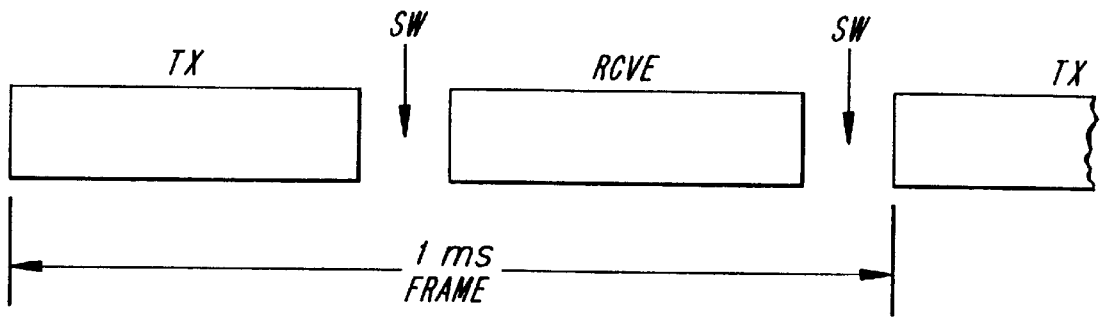
FIG. 11 illustrates switch time.

Dead time is used for switching from transmit (TX) mode to receive (RCVE) mode, and vice versa as illustrated in FIG. 11. In this example, $f_c$=10.368 MHz (required by adaptive delta pulse code modulation (ADPCM)). The symbol-matched filter 64 chips=1 symbol=1 bit and the frame time is $T_{frame}$=1 ms.

In 1 ms there are 10,368 chips which equals 162 symbols, which equals 162 bits. In 1 ms there are 32 bits of voice at 32 kb/s.

The *TX* packet

| | | | |
|---|---|---|---|
| 15 | symbols | = | header which is detected by a 15-stage frame-matched filter |
| 1–2 | symbols | = | APC |
| 1–2 | symbols | = | signaling |
| 32 | symbols | = | voice (assuming 32 kb/s is used) |
| 1 | symbols | = | do not care, used to compensate for propagation delay |
| 21 | symbols | = | CRC |
| 73 | symbols | | |

The receive packet duration is equal to the transmit packet duration.

The switch (SW) times, FIG. 11, are needed to switch the RF from the TX mode to the RCVE mode and vice versa. Approximately 50 microseconds is needed. An embodiment of the present invention uses 8 symbols.

Timing

| | | |
|---|---|---|
| | 73 | symbols *TX* |
| | 73 | symbols/ *RCVE* |
| | 8 | *SW* |
| | 8 | *SW* |
| | 162 | symbols/frame |

Frequency Division Duplex
An example of a FDD packet is
10.368 MHz=ADPCM clock
20.736 Mchips/s=$f_c$=chip clock
256 chips/symbol in symbol-matched filter
81 symbols/ms
Assume: 1 Frame=4 ms=324 symbols

| Each frame contains 32 symbols: | Header |
|---|---|
| 2 kb/s: | signaling |
| 2 kb/s: | APC |
| Data + CRC | |

Figure 12:
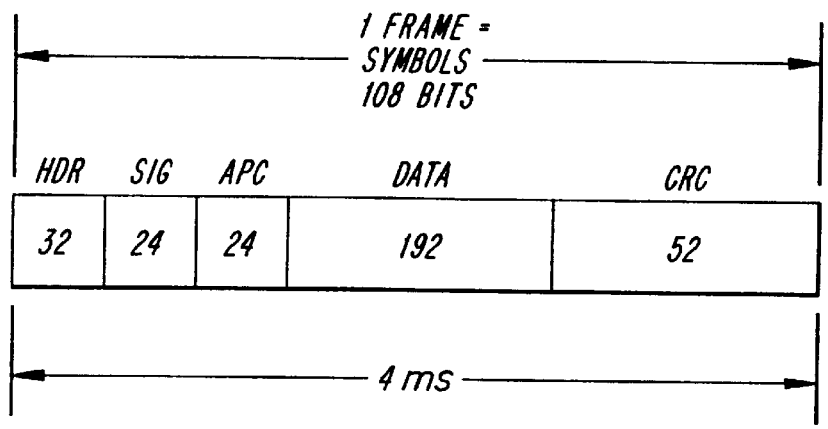

As shown in FIG. 12 for 16 kb/s,

16+2+2=20 kb/s=80 bits/4 ms frame

Figure 13:
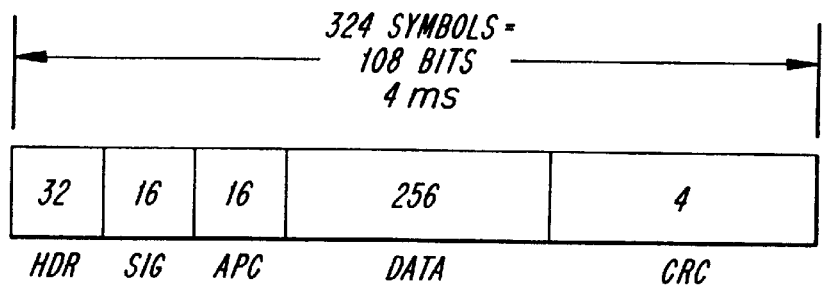

Let 1 bit=3 symbols
240 symbols of data, sig & APC/frame symbols of header 32
267
+ 52   *CRC*
324   total spread APC bits, 3 at a time, uniformly over packet As shown in FIG. 13 for 32 kb/s, 32+2+2=36 kb/s=144 bits/4 ms Let 1 bit=2 symbols 288
+ 32
320
+ 4   *CRC* symbols
324

Figure 14:
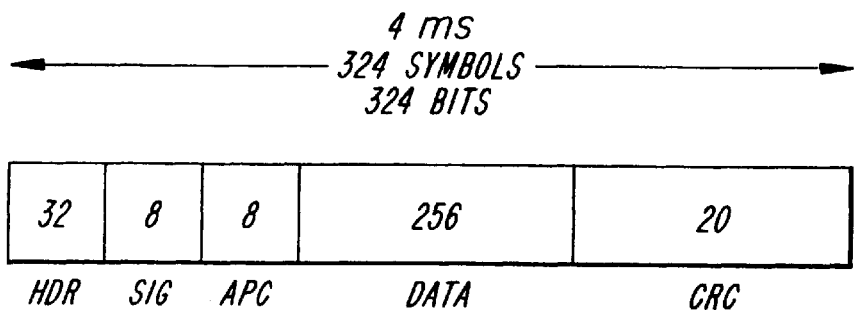

As shown in FIG. 14, for 64 kb/s,

64+2+2=68 kb/s=272 bits/4 ms

Let 1 bit=1 symbol

272
+ 32
304
+ 20   *CRC* symbols
324

Figure 15:
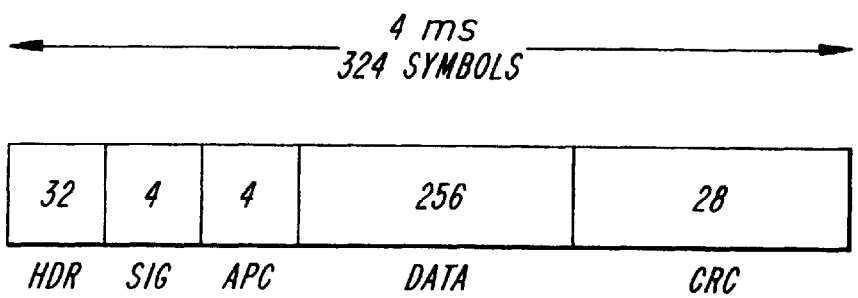

As shown in FIG. 15, for 128 kb/s,

128+2+2=132 kb/ms=528 bits/4 ms

Let 1 bit=½ symbol $$
\begin{array}{r}
264 \\
+\ 32 \\
\hline
296 \\
+\ 28\quad CRC\text{ symbols} \\
\hline
324
\end{array}
$$

Figure 16:
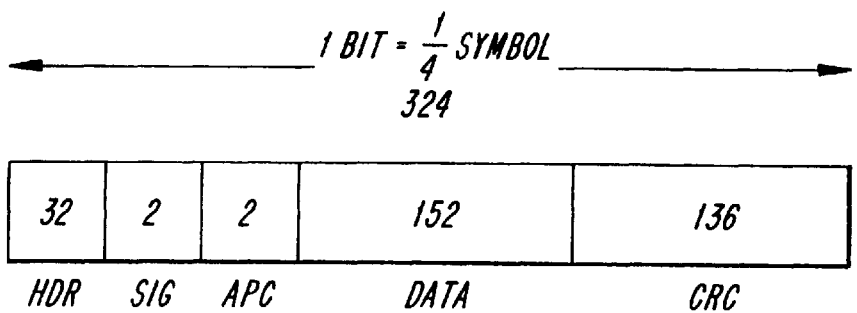

As shown in FIG. 16, for ISDN, 152 kb/s,

152+2+2=156 bits/ms=624 bits/4 ms

Let 1 bit=¼ symbol $$
\begin{array}{r}
156 \\
+\ 32 \\
\hline
188 \\
+136\quad CRC\text{ symbols} \\
\hline
324
\end{array}
$$

As shown in FIG. 17, for 304 kb/s,

304+2+2=308 bits/ms=1232 bits/4 ms

Let 1 bit=⅛ symbol $$
\begin{array}{r}
154 \\
+\ 32 \\
\hline
186 \\
+138\quad CRC\text{ symbols} \\
\hline
324
\end{array}
$$

As shown in FIG. 18, for 384 kb/s,

384+2+2=388 bits/ms=1552 bits/4 ms

Let 1 bit=⅛ symbol $$
\begin{array}{r}
194 \\
+\ 32 \\
\hline
226 \\
+\ 98\quad CRC\text{ symbols} \\
\hline
324
\end{array}
$$

As shown in FIG. 19, for 768 kb/s,

768+2+2=772 bits/ms=3088 bits/4 ms

Let 1 bit=1/16 symbol $$
\begin{array}{r}
193 \\
+\ 32 \\
\hline
225 \\
+\ 99\quad CRC\text{ symbols} \\
\hline
324
\end{array}
$$

As shown in FIG. 20, for 2.048 mchips/sec,

2048+2+2=2052 bits/ms=4104 bits/4 ms

Let 1 bit=1/32 symbol $$
\begin{array}{r}
256 \\
32 \\
+\ 0.5 \\
\hline
288.5 \\
+\ 35.5\quad CRC\text{ symbols} \\
\hline
324
\end{array}
$$

At higher data rates, the power is increased so that $Eb/N_o$ is constant.

Figure 21:
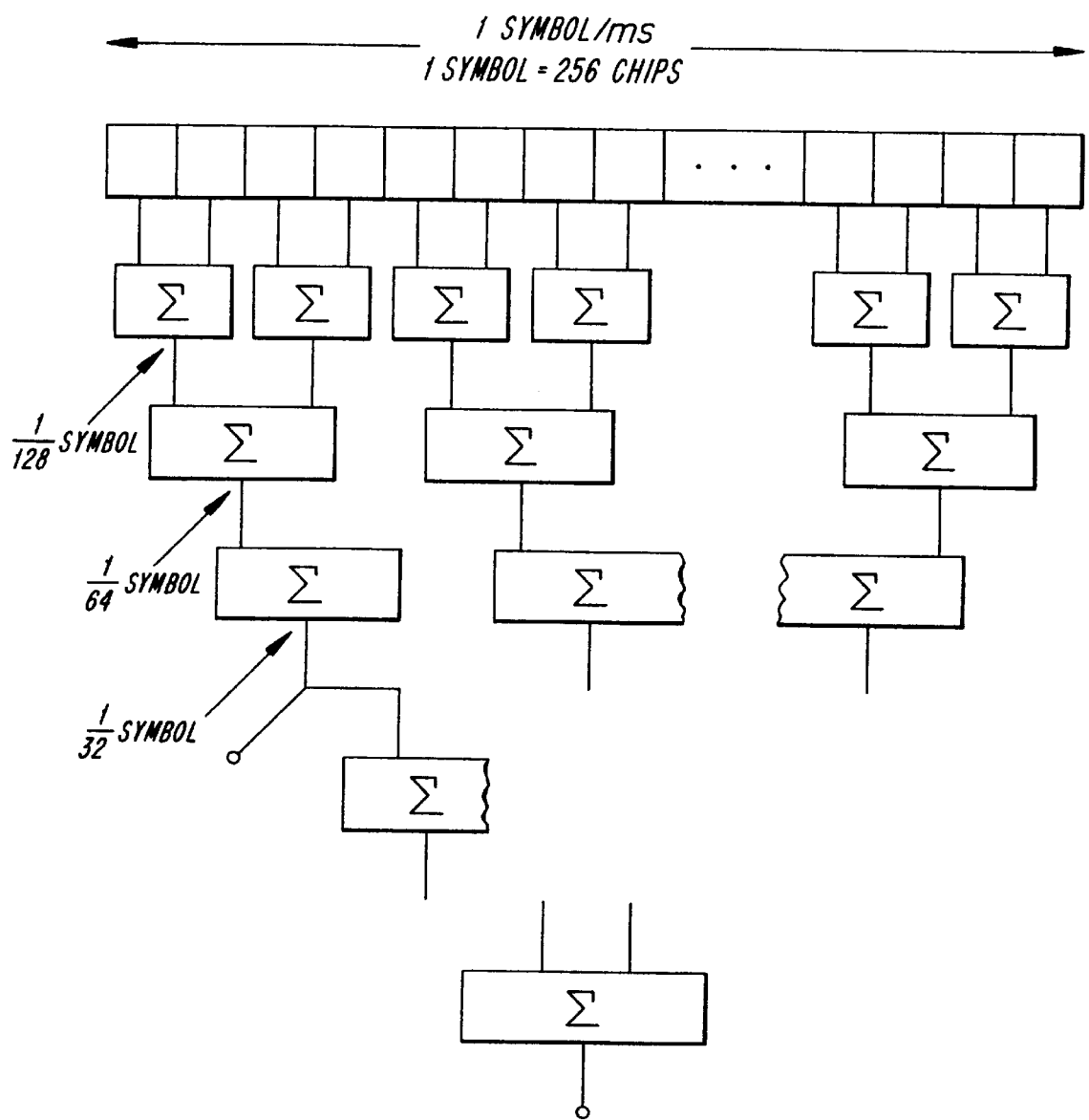
FIG. 21 illustrates adder gates.

As shown in FIG. 21, one has access to a fraction of a symbol. Thus, a chip clock and a symbol clock are required.

Demodulation

If phase varies due to Doppler or oscillator offset, then if the phase variation were small between adjacent bits, differential demodulation can be used.

Since the data, d(t), suffers periodic sign changes due to phase variation, and d(t) and $d(t-T_b)$, which are adjacent bits, frequently suffer the same sign changes since the phase variation between them is small, b(t) can represent the differentially decoded data stream. Differential encoding must be used. If there were no phase variation, then b(t) has twice the error of d(t); see Taub and Schilling, PRINCIPLES OF COMMUNICATION SYSTEMS.

Thus, frequency and phase are locked to the best of ability, and differential decoding is used to compensate for estimation inaccuracies. If the frequency locking were perfect so that the phase were consistent, then coherent detection occurs and the error rate increases by a factor of two.

In the CP, 1 bit=1 symbol, so that the output of the 64 symbol-matched filter is the bit stream shown in the packet.

In the WLL & DCS chip, at low data rates, 1 bit is equal to 2 or more symbols. In that case the symbols are added prior to differential decoding. High data rates use less than 1 symbol.

Handoff System

In a cellular system a user, when receiving beyond the cell border, experiences a loss in signal-to-noise ratio, which results in increased errors and reduced signal quality of transmission. To allow continual communications, cellular type systems employ handoff where the user communicates first with the first base station and then with a second base station whose received power is stronger.

Handoff algorithms require the remote unit and/or the base station communicating with the remote unit, to monitor the signal quality and, if it is degraded excessively, to request handoff to another base station. In the matched-filter system previously discussed, quality may be measured by reading the symbol-matched filter voltage level. For example, a 256-stage symbol-matched filter would read 256 if there were no errors, 254 with 1 chip in error, etc.

The remote unit can, with a single matched filter, by multiplexing its duties, use the single matched filter for in-phase and quadrature-phase communications with the first base station and for in-phase and quadrature-phase scanning of the other adjacent cells, typically six. One signal from each base station is used for handoff and uses a known code. This is analogous to AMPS where a specified frequency band is always used for handoff implementation.

Figure 22:
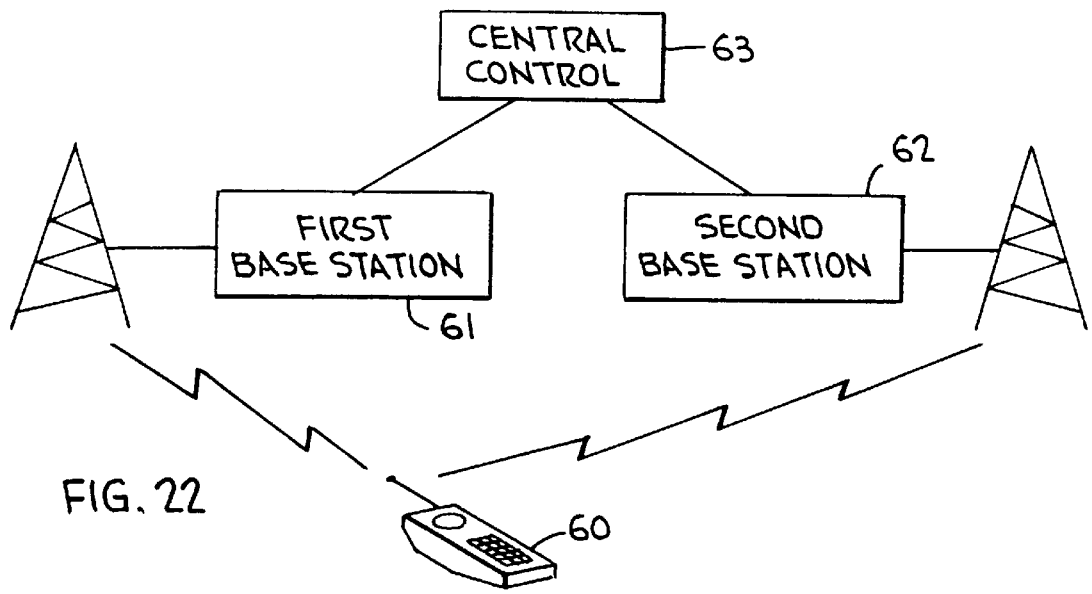
FIG. 22 illustrates a remote unit handing off between two base stations.

The present invention provides a spread-spectrum-communication system for a remote unit handing-off between two base stations. As shown in FIG. 22, the system includes a central control unit 63, a plurality of base stations 61, 62, and a remote unit 60; there may be a plurality of remote units. The remote unit transmits data to a first base station 61 of the plurality of base stations at a first data rate and a first power level, and then hands off from the first base station to a second base station 62, through the central control unit 63, in response to signal quality monitoring and comparison.

The remote unit includes transmitting means, receiving means, monitoring means, first memory means, selecting means, comparison means, and processor means. The processor means is coupled between the transmitting means and the comparison means. The monitoring means is coupled between the receiving means and the comparison means. The selecting means is coupled between the first memory means and the comparison means. The first memory means is coupled to the receiving means. The second memory means is coupled to the processor means. In some embodiments, a single memory means may be sufficient in which case the single memory means is coupled to the receiving means and to the processor means. The system may further comprise code generating means, coupled to the receiving means. The receiving means typically includes matched means.

The transmitting means is for transmitting data from the remote unit to the first base station at a first data rate and a first power level. Receiving means is for receiving a plurality of received-spread-spectrum signals radiated from the plurality of base stations. Matched means having a first chip code is for despreading a first received-spread-spectrum signal. Monitoring means, coupled to the output of the matched means, is for monitoring a first signal quality of the first received-spread-spectrum signal. First memory means, coupled to said receiving means, is for storing a plurality of signal qualities for the plurality of received-spread-spectrum signals, respectively. Selecting means, coupled to the first memory means, is for selecting, from the plurality of received-spread-spectrum signals, a second received-spread-spectrum signal having a second signal quality. The second received-spread-spectrum signal is transmitted from a second base station of the plurality of base stations. The second received-spread-spectrum signal is selected using the plurality of signal qualities stored in the first memory means. Selection may be based upon a comparison of power level, signal-to-noise ratio, or probability of error.

Comparison means, coupled to the monitoring means and to the selecting means, is for comparing the first signal quality to at least one of a predetermined threshold and the second signal quality. The comparison means may compare the first signal quality to both a predetermined threshold and the second signal quality. Processor means, responsive to the first signal quality falling below any of the predetermined threshold and the second signal quality, or both, initiates handoff to the second base station and queues data for transmission. Second memory means, responsive to handoff initiation, stores the data queued for transmission. Processor means completes handoff to the second base station and directs the matched means to despread, using a second chip code, the second received-spread-spectrum signal. In response to handoff completion, transmitting means transmits the stored data to the second base station. The stored data is transmitted at a second data rate and a second power level, with the second data rate greater than the first data rate and with the second power level greater than the first power level. This increase in power level and data rate, effectively a burst transmission, transfers the stored data to the second base station allowing the remote unit to transmit both accumulated data and current data without data loss.

Figure 23:
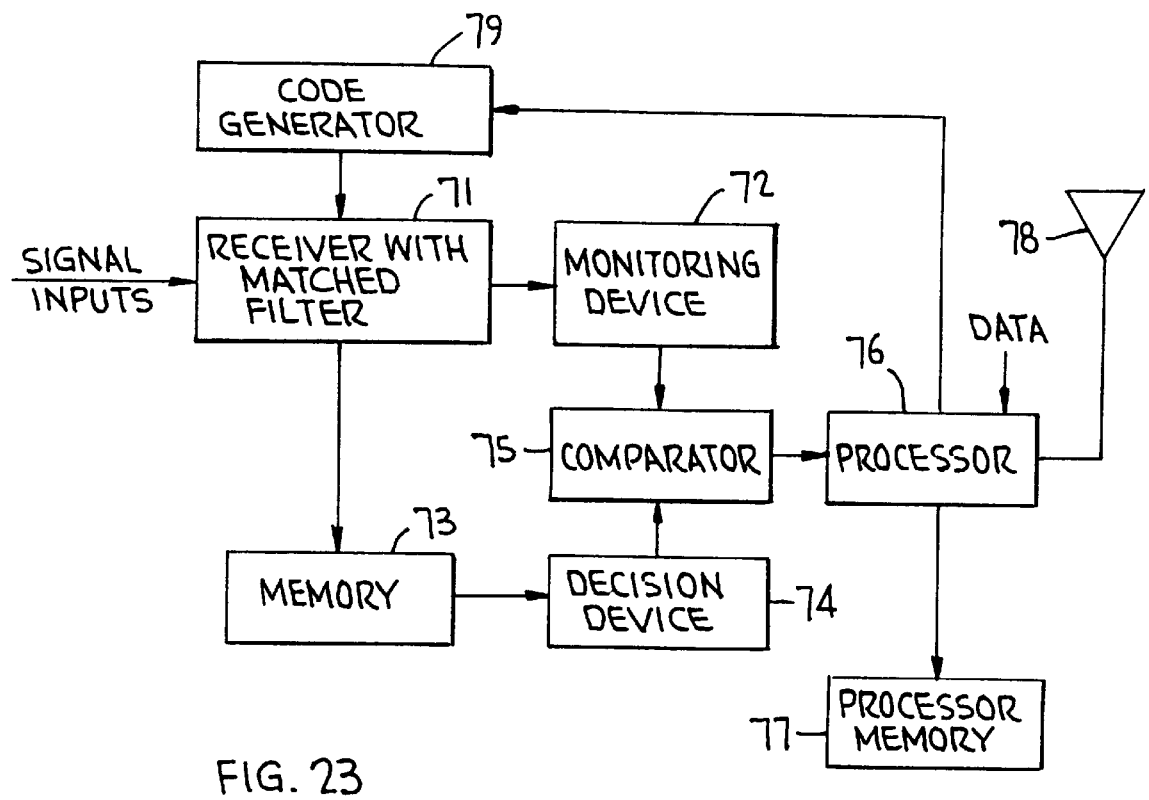
FIG. 23 is a block diagram of the remote unit.

As shown in FIG. 23, receiving means may be embodied as a receiver 71 with matched filter. First memory means may be embodied as a memory 73. Monitoring means may be embodied as a monitoring device 72. Selecting means may be embodied as a decision device 74 coupled to the memory 73. Comparison means may be embodied as a comparator 75 coupled to the monitoring device 72 and to the decision device 74. Processor means may be embodied as a processor 76, and second memory means may be embodied as a processor memory 77 coupled to the processor 76. Transmitting means may be embodied as a transmitter 78 coupled to the processor 76. Code generating means may be embodied as a code generator 79 coupled to the receiver with matched filter 71 for changing a chip code of the matched filter.

In the illustrative example shown in FIG. 22, the remote unit 60 is assumed to be communicating with a first base station 61 using spread-spectrum modulation. The remote unit 60 has a matched filter, as previously discussed, for despreading a first received-spread-spectrum signal transmitted from the first base station 61. The remote unit 60 transmits data to the first base station 61 at a first data rate and at a first power level. When handoff is complete, the remote unit 60 receives a second received-spread-spectrum signal from the second base station 62. The method of the present invention preferably is performed in an application specific integrated circuit (ASIC), although the method also could be performed in a general purpose, digital signal processor, or in discrete electronic components.

Following handoff, the remote unit 60 typically transmits data at the first data rate and the first power level to the second base station 62. The remote 60 unit may, however, transmit data to the second base station 62 at a data rate and/or at a power level different from the first data rate and the first power level. The latter case might occur if the second base station 62, by way of example, covered a large geographical area and the remote unit 60 were in an outlying area from that base station. Other examples include a change from voice to video transmission, or a geographical situation that includes buildings, requiring the second base station 62 to have a different data rate or power level from that of the first base station 61. Similarly, the data rates may change between base stations.

The method of the present invention includes the step of monitoring, at the output of the matched filter of the remote unit 60, a first signal quality of the first received-spread-spectrum signal transmitted from the first base station 61. By first signal quality is meant a signal quality as used for determining the quality of the signal transmitted as is known in the art. Typical parameters used for signal quality include, but are not limited to, probability of error, power level, and signal-to-noise ratio. The monitoring at the output of the matched filter is for determining how well the signal is being received from the first base station 61, in order to ultimately make a decision as to whether to initiate a handoff. Thus, if the probability of error associated with the first receivedspread-spectrum signal increased, or the signal power level or signal-to-noise ratio associated with the first received-spread-spectrum signal decreased below a threshold, for example, then a decision is made to initiate a handoff.

Alternatively, the probability of error of the first received-spread-spectrum signal may be compared to a probability of error of a second spread-spectrum signal, and a decision to handoff can be made when the probability of error of the first received-spread-spectrum signal increases or becomes greater than the probability of error of the second received-spread-spectrum signal. Similarly, if the power level or signal-to-noise ratio of the first received-spread-spectrum signal falls below the power level or signal-to-noise ratio of the second received-spread-spectrum signal, then a decision can be made to initiate a handoff.

The method includes the step of scanning, at the remote unit, a plurality of received-spread-spectrum signals radiated from the plurality of base stations. This step provides a method of determining which base stations are available for handoff; typically the available base stations are the neighboring base stations.

For the plurality of received-spread-spectrum signals, the method stores, at the remote unit, a plurality of signal qualities, respectively. By system design, the signal quality criteria such as probability of error, power level or signal-to-noise ratio, are measured and stored at the remote unit. The storing may be accomplished in a digital memory, such as a random access memory (RAM), or other memory devices.

The method typically includes the step of selecting from the plurality of received-spread-spectrum signals, using the plurality of signal qualities from the plurality of received-spread-spectrum signals, a second received-spread-spectrum signal. Typically, a criterion is set for selecting the second received-spread-spectrum signal from the plurality of received-spread-spectrum signals. As already discussed, this criterion could be based on signal quality; the second received-spread-spectrum signal is that received-spread-spectrum signal having a signal quality better than the rest of the signals in the plurality of received-spread-spectrum signals.

The remote unit continually scans adjacent channels and keeps a record of the received-spread-spectrum signal having, e.g., the lowest probability of error, $P_e$, and also being below a threshold. Each scan of the preferred base station, i.e., the second base station, is recorded and stored in memory; however, no action takes place until the quality of communication with the first base station is sufficiently degraded. By way of example in reference to FIG. 22, when the probability of error, $P_e$, with the first base station 61 increases above a threshold, the remote unit 60 sends a request to the central control unit 63 through the first base station 61 to have the first base station 61 switch the remote unit 60 to the preferred base station, i.e., the second base station 62.

The method further includes the step of determining when the first signal quality is degraded as compared with a predetermined threshold and/or the second signal quality. Thus, the method can be based on comparing the second signal quality to the first signal quality. Alternatively, the method may be based on comparing the first signal quality to a threshold. The method may be based on comparing the first signal quality to the second signal quality and to a predetermined handoff threshold. In essence, this could be based on a maximum likelihood receiver, or a simple threshold device, or other techniques for choosing when to initiate a handoff.

For probability of error, handoff to the second base station would be initiated when the second received-spread-spectrum signal has a lower probability of error than the first received-spread-spectrum signal. For signal-to-noise ratio or power, handoff would be initiated when the second received-spread-spectrum signal has a higher signal-to-noise ratio or greater power level, respectively, than does the first received-spread-spectrum signal.

Whatever criteria is used, when the remote unit determines it is time for a handoff, the remote unit initiates handoff to the second base station 62. A request is sent from the remote unit 60 to the first base station 61, and from the first base station 61 to a central control unit 63. The central control unit 63 is common to the first base station 61 and the second base station 62. Upon receiving the request at the first base station 61 and at the central control unit 63, and acknowledging that it is time for a handoff, the method includes queuing and storing, at the remote unit, the data that would have been transmitted to the first base station 61 during the handoff period. The storing step typically, although not necessarily, cuts off data transmission during handoff, and the data that would normally be transmitted during the handoff is queued, stored and then transmitted at a later point in time. The remote unit 60 could also receive transmissions from both the first base station 61 and the second base station 62 during this transmit period and then either combine them or use the best quality signal.

The next step is to complete handoff to the second base station 62. At this point, the remote unit 60 synchronizes to the second received-spread-spectrum signal. When the remote unit 60 is synchronized to the second received-spread-spectrum signal, the data that was stored during the handoff period is transmitted to the second base station 62. The time for this handoff might be on the order of milliseconds, thus the stored data would typically not be voluminous.

Since the stored data increases the quantity of data that has to be transmitted to the second base station 62, a larger capacity channel is required to send the stored data along with the data that would normally be transmitted. Thus, the method transmits the stored data from the remote unit 60 to the second base station 62 at a second data rate. The second data rate is typically a higher or faster rate than the first data rate. Also, the method may include transmitting to the second base station 62 the stored data at a second power level. The second data rate and the second power level, by way of example, might be twice the first data rate and the first power level, respectively. Typically for a higher data rate, one has to increase the channel capacity in the channel. One way to accomplish this increase in channel capacity is to increase the power level. Since the stored data is transmitted for a short period of time, such as a few microseconds or even a few seconds, the transmission at the higher data rate and power level would be for a short duration of time and thus would not significantly interfere with other remote units.

After the stored data is transmitted to the second base station 62, then the remote unit 60 continues transmitting at a preferred data rate which typically might be the normal data rate and normal power level of the second base station 62. In many instances, by way of example, the normal data rate and normal power level of the second base station might equal the first data rate and the first power level. Thus, the second data rate is a temporary data rate for transmitting the stored data to the second base station 62; once the stored data is transmitted, the remote unit 60 continues transmitting at its normal data rate.

It will be apparent to those skilled in the art that various modifications can be made to the matched filter-based handoff method and apparatus of the instant invention without departing from the scope or spirit of the invention, and it is intended that the present invention cover modifications and variations of the matched filter-based handoff method and apparatus provided they come within the scope of the appended claims and their equivalents.

I claim:

1. In a spread-spectrum-communications system having a plurality of base stations and a remote unit, with the remote unit communicating with a first base station using spread-spectrum modulation, with the remote unit despreading a first received-spread-spectrum signal transmitted from the first base station, and with the remote unit transmitting data to the first base station at a first data rate and a first power level, a method comprising the steps of:

monitoring, at said remote unit, a first signal quality of the first received-spread-spectrum signal;

scanning, at said remote unit, a plurality of received-spread-spectrum signals radiated from the plurality of base stations, respectively;

storing, at said remote unit, a plurality of signal qualities for the plurality of received-spread-spectrum signals, respectively;

selecting, from the plurality of received-spread-spectrum signals, at said remote unit, using the plurality of signal qualities from the plurality of received-spread-spectrum signals, a second received-spread-spectrum signal having a second signal quality transmitted from a second base station;

determining when the first signal quality falls below any of a predetermined handoff threshold and the second signal quality;

initiating, from said remote unit, upon the first signal quality falling below any of the predetermined handoff threshold and the second signal quality, handoff to the second base station;

queuing, upon requesting handoff to the second base station, data for transmission at said remote unit;

storing the queued data;

synchronizing, at said remote unit, to the second received-spread-spectrum signal and handing off from said first base station to said second base station; and transmitting, from said remote unit to said second base station, the stored data at a second data rate, with the second data rate greater than the first data rate, thereby transferring the stored data to said second base station.

2. The method as set forth in claim 1 wherein the step of selecting the second received-spread-spectrum signal having the second signal quality includes the step of selecting the second received-spread-spectrum signal with the second signal quality better than the plurality of signal qualities of the plurality of received-spread-spectrum signals, respectively.

3. The method as set forth in claim 1 wherein:

the step of monitoring the first signal quality includes the step of monitoring a first probability of error of the first received-spread-spectrum signal transmitted from said first base station;

the step of storing the plurality of signal qualities includes the step of storing a plurality of probabilities of error for the plurality of received-spread-spectrum signals, respectively;

the step of selecting includes the step of selecting, from the plurality of received-spread-spectrum signals, at said remote unit, using the plurality of probabilities of error from the plurality of received-spread-spectrum signals, the second received-spread-spectrum signal having a second probability of error; and the step of initiating includes the step of requesting, from said remote unit, upon any of the first probability of error greater than the predetermined handoff threshold and the first probability of error greater than the second probability of error, handoff to the second base station.

4. The method as set forth in claim 3 wherein the step of selecting the second received-spread-spectrum signal having the second probability of error includes the step of selecting the second received-spread-spectrum signal with the second probability of error lower than the plurality of probabilities of error of the plurality of received-spread-spectrum signals, respectively.

5. The method as set forth in claim 1 wherein:

the step of monitoring the first signal quality includes the step of monitoring the first power level of the first received-spread-spectrum signal transmitted from said first base station;

the step of storing the plurality of signal qualities includes the step of storing a plurality of power levels for the plurality of received-spread-spectrum signals, respectively;

the step of selecting includes the step of selecting, from the plurality of received-spread-spectrum signals, at said remote unit, using the plurality of power levels from the plurality of received-spread-spectrum signals, the second received-spread-spectrum signal having a second power level; and the step of initiating includes the step of requesting, from said remote unit, upon the first power level falling below any of the predetermined handoff threshold and the second power level, handoff to the second base station.

6. The method as set forth in claim 5 wherein the step or selecting the second received-spread-spectrum signal having the second power level includes the step of selecting the second received-spread-spectrum signal with the second power level greater than the plurality of power levels of the plurality of received-spread-spectrum signals, respectively.

7. In a spread-spectrum-communications network having a central control unit, a plurality of base stations and a remote unit, with the remote unit transmitting data to a first base station of said plurality of base stations at a first data rate and a first power level, a system for handing off from the first base station to a second base station, through the central control unit, without data loss, the system comprising:

transmitting means, located at the remote unit, for transmitting data from the remote unit to the first base station at the first data rate and the first power level;

receiving means, located at the remote unit, for receiving a plurality of received-spread-spectrum signals radiated from the plurality of base stations, said receiving means including matched filter means for despreading a first received-spread-spectrum signal;

monitoring means for monitoring, at the output of said matched filter means, a first signal quality of the first received-spread-spectrum signal;

first memory means, coupled to said receiving means, for storing a plurality of signal qualities for the plurality of received-spread-spectrum signals, respectively;

selecting means, coupled to said first memory means, for selecting, from the plurality of received-spread-spectrum signals using the plurality of signal qualities stored in said first memory means, a second received-spread-spectrum signal having the second signal quality transmitted from the second base station of said plurality of base stations;

comparison means, coupled to said monitoring means and to said selecting means, for comparing the first signal quality to at least one of a predetermined threshold and the second signal quality;

processor means, coupled to said comparison means, responsive to the first signal quality falling below any of the predetermined threshold and the second signal quality, for initiating handoff to the second base station and for queuing data for transmission;

second memory means, coupled to said processor means, responsive to handoff initiation, for storing the data queued for transmission;

said processor means for completing handoff to said second base station and for setting said matched filter means to despread the second received-spread-spectrum signal; and said transmitting means, responsive to handoff completion, for transmitting to said second base station the stored data at a second data rate, with the second data rate greater than the first data rate, thereby transferring the stored data to the second base station.

8. The system as set forth in claim 7 wherein said selecting means includes means for selecting the second received-spread-spectrum signal with the second signal quality better than the plurality of signal qualities of the plurality of received-spread-spectrum signals, respectively.

9. The system as set forth in claim 7 wherein:

said monitoring means includes means for monitoring a first probability of error of the first received-spread-spectrum signal transmitted from said first base station;

said first memory means includes means for storing a plurality of probabilities of error for the plurality of received-spread-spectrum signals, respectively;

said selecting means includes means for selecting, from the plurality of received-spread-spectrum signals, at said remote unit, using the plurality of probabilities of error from the plurality of received-spread-spectrum signals, the second received-spread-spectrum signal having a second probability of error; and said processor means includes means for initiating, from said remote unit, upon the first probability of error greater than the predetermined handoff threshold or greater than the second probability of error, handoff to the second base station.

10. The system as set forth in claim 9 wherein said selecting means includes means for selecting the second received-spread-spectrum signal with the second probability of error less than the plurality of probabilities of error of the plurality of received-spread-spectrum signals, respectively.

11. The system as set forth in claim 7 wherein:

said monitoring means includes means for monitoring the first power level of the first received-spread-spectrum signal;

said first memory means includes means for storing a plurality of power levels for the plurality of received-spread-spectrum signals, respectively;

said selecting means includes means for selecting, from the plurality of received-spread-spectrum signals, at said remote unit, using the plurality of power levels from the plurality of received-spread-spectrum signals, the second received-spread-spectrum signal having a second power level; and said processor means includes means for initiating, from said remote unit, upon the first power level falling below any of the predetermined handoff threshold and the second power level, handoff to the second base station.

12. The system as set forth in claim 11 wherein said selecting means includes means for selecting the second received-spread-spectrum signal with the second power level greater than the plurality of power levels of the plurality of received-spread-spectrum signals, respectively.

13. The system as set forth in claim 7 further comprising:

code generating means, coupled to said processor means and to said receiving means, for changing, responsive to handing off from the first base station to the second base station, a chip code of said matched filter means.

14. A cellular spread-spectrum-communications system for handing off between a plurality of base stations without data loss comprising:

a central control unit;

a first base station having a first base-transmitter for transmitting a first spread-spectrum signal;

a second base station having a second base-transmitter for transmitting a second spread-spectrum signal; and a remote unit including,
  a transmitter for transmitting data from the remote unit to the first base station at a first data rate and a first power level;
  a receiver for receiving a plurality of spread-spectrum signals radiated from the plurality of base stations, the plurality of spread-spectrum signals received including the first spread-spectrum signal;
  despreading means, coupled to said receiver, for despreading the first received-spread-spectrum signal;
  a monitoring device for monitoring, at the output of said despreading means, a first signal quality of the first received-spread-spectrum signal;
  a first memory, coupled to said receiver, for storing a plurality of signal qualities for the plurality of received-spread-spectrum signals, respectively;
  a decision device, coupled to said first memory, for selecting, from the plurality of received-spread-spectrum signals using the plurality of signal qualities stored in said first memory, the second received-spread-spectrum signal having a second signal quality transmitted from the second base station;

a comparator, coupled to said monitoring device and to said decision device, for comparing the first signal quality to at least one of a predetermined threshold and the second signal quality;

a processor, coupled to said comparator, responsive to the first signal quality falling below any of the predetermined threshold and the second signal quality, for initiating handoff to the second base station and for queuing data for transmission;

a second memory, coupled to said processor, responsive to handoff initiation, for storing the data queued for transmission;

said processor for completing handoff to said second base station and for changing a chip code of said despreading means to despread the second received-spread-spectrum signal; and said transmitter, responsive to handoff completion, for transmitting to said second base station the stored data at a second data rate, with the second data rate greater than the first data rate, thereby transferring the stored data to the second base station.

15. In a spread-spectrum-communications system having a plurality of base stations and a remote unit, with the remote unit communicating with a first base station using spread-spectrum modulation, with the remote unit having a matched filter for despreading a first received-spread-spectrum signal transmitted from the first base station, and with the remote unit transmitting data to the first base station at a first data rate, a method comprising the steps of:

monitoring, at said remote unit, a first signal quality of the first received-spread-spectrum signal;

scanning, at said remote unit, a plurality of received-spread-spectrum signals radiated from the plurality of base stations, respectively;

storing, at said remote unit, a plurality of signal qualities for the plurality of received-spread-spectrum signals, respectively;

selecting, from the plurality of received-spread-spectrum signals, at said remote unit, using the plurality of signal qualities from the plurality of received-spread-spectrum signals, a second received-spread-spectrum signal having a second signal quality transmitted from a second base station;

determining when the first signal quality falls below any of a predetermined handoff threshold and the second signal quality;

initiating, from said remote unit, upon the first signal quality falling below any of the predetermined handoff threshold and the second signal quality, handoff to the second base station;

synchronizing, at said remote unit, to the second received-spread-spectrum signal and handing off from said first base station to said second base station; and transmitting, from said remote unit to said second base station, the data at a second data rate and, with the second data rate greater than the first data rate, thereby transferring the stored data to said second base station.

16. The method as set forth in claim 15 wherein the step of selecting the second received-spread-spectrum signal having the second signal quality includes the step of selecting the second received-spread-spectrum signal with the second signal quality better than the plurality of signal qualities of the plurality of received-spread-spectrum signals, respectively.

17. The method as set forth in claim 15 wherein:

the step of monitoring the first signal quality includes the step of monitoring a first probability of error of the first received-spread-spectrum signal transmitted from said first base station;

the step of storing the plurality of signal qualities includes the step of storing a plurality of probabilities of error for the plurality of received-spread-spectrum signals, respectively;

the step of selecting includes the step of selecting, from the plurality of received-spread-spectrum signals, at said remote unit, using the plurality of probabilities of error from the plurality of received-spread-spectrum signals, the second received-spread-spectrum signal having a second probability of error; and the step of initiating includes the step of requesting, from said remote unit, upon any of the first probability of error greater than the predetermined handoff threshold and the first probability of error greater than the second probability of error, handoff to the second base station.

18. The method as set forth in claim 17 wherein the step of selecting the second received-spread-spectrum signal having the second probability of error includes the step of selecting the second received-spread-spectrum signal with the second probability of error lower than the plurality of probabilities of error of the plurality of received-spread-spectrum signals, respectively.

19. The method as set forth in claim 15 wherein:

the step of monitoring the first signal quality includes the step of monitoring a first power level of the first received-spread-spectrum signal transmitted from said first base station;

the step of storing the plurality of signal qualities includes the step of storing a plurality of power levels for the plurality of received-spread-spectrum signals, respectively;

the step of selecting includes the step of selecting, from the plurality of received-spread-spectrum signals, at said remote unit, using the plurality of power levels from the plurality of received-spread-spectrum signals, the second received-spread-spectrum signal having a second power level; and the step of initiating includes the step of requesting, from said remote unit, upon the first power level falling below any of the predetermined handoff threshold and the second power level, handoff to the second base station.

20. The method as set forth in claim 19 wherein the step of selecting the second received-spread-spectrum signal having the second power level includes the step of selecting the second received-spread-spectrum signal with the second power level greater than the plurality of power levels of the plurality of received-spread-spectrum signals, respectively.

21. In a spread-spectrum-communications network having a central control unit, a plurality of base stations and a remote unit, with the remote unit transmitting data to a first base station of said plurality of base stations at a first data rate and a first power level, a system for handing off from the first base station to a second base station, through the central control unit, without data loss, the system comprising:

transmitting means, located at the remote unit, for transmitting data from the remote unit to the first base station at the first data rate;

receiving means, located at the remote unit, for receiving a plurality of received-spread-spectrum signals radiated from the plurality of base stations, said receiving means including matched filted means for despreading a first received-spread-spectrum signal;

monitoring means for monitoring, at the output of said matched filter means, a first signal quality of the first received-spread-spectrum signal;

memory means, coupled to said receiving means, for storing a plurality of signal qualities for the plurality of received-spread-spectrum signals, respectively;

selecting means, coupled to said memory means, for selecting, from the plurality of received-spread-spectrum signals using the plurality of signal qualities stored in said memory means, a second received-spread-spectrum signal having a second signal quality transmitted from a second base station of said plurality of base stations;

comparison means, coupled to said monitoring means and to said selecting means, for comparing the first signal quality to at least one of a predetermined threshold and the second signal quality;

processor means, coupled to said comparison means, responsive to the first signal quality falling below any of the predetermined threshold and the second signal quality, for initiating handoff to the second base station and for queuing data for transmission;

said processor means for completing handoff to said second base station and for setting said matched filted means to despread the second received-spread-spectrum signal; and said transmitting means, responsive to handoff completion, for transmitting to said second base station the stored data at a second data rate, with the second data rate greater than the first data rate, thereby transferring the stored data to the second base station.

22. The system as set forth in claim 21 wherein said selecting means includes means for selecting the second received-spread-spectrum signal with the second signal quality better than the plurality of signal qualities of the plurality of received-spread-spectrum signals, respectively.

23. The system as set forth in claim 21 wherein:

said monitoring means includes means for monitoring a first probability of error of the first received-spread-spectrum signal transmitted from said first base station;

said memory means includes means for storing a plurality of probabilities of error for the plurality of received-spread-spectrum signals, respectively;

said selecting means includes means for selecting, from the plurality of received-spread-spectrum signals, at said remote unit, using the plurality of probabilities of error from the plurality of received-spread-spectrum signals, the second received-spread-spectrum signal having a second probability of error; and said processor means includes means for initiating, from said remote unit, upon the first probability of error greater than the predetermined threshold or greater than the second probability of error, handoff to the second base station.

24. The system as set forth in claim 23 wherein said selecting means includes means for selecting the second received-spread-spectrum signal with the second probability of error less than the plurality of probabilities of error of the plurality of received-spread-spectrum signals, respectively.

25. The system as set forth in claim 21 wherein:

said monitoring means includes means for monitoring a first power level of the first received-spread-spectrum signal;

said memory means includes means for storing a plurality of power levels for the plurality of received-spread-spectrum signals, respectively;

said selecting means includes means for selecting, from the plurality of received-spread-spectrum signals, at said remote unit, using the plurality of power levels from the plurality of received-spread-spectrum signals, the second received-spread-spectrum signal having a second power level; and said processor means includes means for initiating, from said remote unit, upon the first power level falling below any of the predetermined threshold and the second power level, handoff to the second base station.

26. The system as set forth in claim 25 wherein said selecting means includes means for selecting the second received-spread-spectrum signal with the second power level greater than the plurality of power levels of the plurality of received-spread-spectrum signals, respectively.

27. The system as set forth in claim 21 further comprising code generating means, coupled to said processor means and to said receiving means, for changing, responsive to handing off from the first base station to the second base station, a chip code of said matched filter means.

28. In a spread-spectrum-communications network having a central control unit, a plurality of base stations and a remote unit, with the remote unit transmitting data to a first base station of said plurality of base stations at a first data rate and a first power level, a system for handing off from the first base station to a second base station, through the central control unit, without data loss, the system comprising:

a transmitter, located at the remote unit, for transmitting data from the remote unit to the first base station at the first data rate and the first power level;

a receiver, located at the remote unit, for receiving a plurality of received-spread-spectrum signals radiated from the plurality of base stations, said receiver including a matched filter for despreading a first received-spread-spectrum signal;

a code generator, coupled to said receiver, for setting a chip-code of said matched filter;

a monitoring device for monitoring, at the output of said receiver, a first signal quality of the first received-spread-spectrum signal;

a decision device, coupled to said monitoring device, for selecting, from the plurality of received-spread-spectrum signals, a second received-spread-spectrum signal having a second signal quality transmitted from the second base station of said plurality of base stations;

a comparator, coupled to said monitoring device and to said decision device, for comparing the first signal quality to at least one of a predetermined threshold and the second signal quality;

a processor, coupled to said comparator and to said code generator, responsive to the first signal quality falling below any of the predetermined threshold and the second signal quality, for initiating handoff to the second base station and for queuing data for transmission;

said processor for completing handoff to said second base station;

said code generator, responsive to said processor, for changing the chip code of said matched filter to despread the second received-spread-spectrum signal; and said transmitter, responsive to handoff completion, for transmitting to said second base station the stored data at a second data rate, with the second data rate greater than the first data rate, thereby transferring the stored data to the second base station.

29. A cellular spread-spectrum-communications system for handing off between a plurality of base stations without data loss comprising:

a central control unit;

a first base station having a first base-transmitter for transmitting a first spread-spectrum signal;

a second base station having a second base-transmitter for transmitting a second spread-spectrum signal; and a remote unit including, a transmitter for transmitting data from the remote unit to the first base station at a first data rate;

a receiver for receiving a plurality of spread-spectrum signals radiated from the plurality of base stations, the plurality of spread-spectrum signals received including the first spread-spectrum signal;

despreading means for despreading the first received-spread-spectrum signal;

a monitoring device for monitoring, at the output of said despreading means, a first signal quality of the first received-spread-spectrum signal;

a memory, coupled to said receiver, for storing a plurality of signal qualities for the plurality of received-spread-spectrum signals, respectively;

a decision device, coupled to said memory, for selecting, from the plurality of received-spread-spectrum signals using the plurality of signal qualities stored in said memory, the second received-spread-spectrum signal having a second signal quality transmitted from the second base station;

a comparator, coupled to said monitoring device and to said decision device, for comparing the first signal quality to at least one of a predetermined threshold and the second signal quality;

a processor, coupled to said comparator, responsive to the first signal quality falling below any of the predetermined threshold and the second signal quality, for initiating handoff to the second base station and for queuing data for transmission;

said processor for completing handoff to said second base station and for changing a chip code of said despreading means to despread the second received-spread-spectrum signal; and said transmitter, responsive to handoff completion, for transmitting to said second base station the stored data at a second data rate, with the second data rate greater than the first data rate, thereby transferring the stored data to the second base station.

* * * * *